(12) United States Patent
Mu

(10) Patent No.: US 7,908,656 B1
(45) Date of Patent: Mar. 15, 2011

(54) CUSTOMIZED DATA GENERATING DATA STORAGE SYSTEM FILTER FOR DATA SECURITY

(75) Inventor: Paul Yuedong Mu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 965 days.

(21) Appl. No.: 11/789,004

(22) Filed: Apr. 23, 2007

(51) Int. Cl.
*G06F 11/00* (2006.01)
(52) U.S. Cl. ........................... 726/22; 726/23
(58) Field of Classification Search ............... 726/22–26; 713/150, 152–154, 187–188, 192–194; 709/225, 709/229
See application file for complete search history.

(56) References Cited

U.S. PATENT DOCUMENTS

| | | | |
|---|---|---|---|
| 5,568,629 | A | 10/1996 | Gentry et al. |
| 5,889,934 | A | 3/1999 | Peterson |
| 6,298,445 | B1 * | 10/2001 | Shostack et al. ............... 726/25 |
| 7,127,577 | B2 | 10/2006 | Koning et al. |
| 7,237,021 | B2 | 6/2007 | Penny et al. |

OTHER PUBLICATIONS

Rajeev Nagar, "Filter Manager," Microsoft Corporation, 2003.

* cited by examiner

*Primary Examiner* — Hosuk Song
(74) *Attorney, Agent, or Firm* — Blakely, Sokoloff, Taylor & Zafman LLP

(57) ABSTRACT

A data storage system filter operates through a filter framework in a file system to detect and provide customized responses to unauthorized access attempts. A security event definition determines when file system access events are classified as unauthorized access attempts. A trap manager manages the security events, and causes traps to be installed to capture file system responses. The trapped responses can be replaced with customized data, such as static artificial data, or artificial data generated based on a context of the request and/or response. The security filter can be loaded or unloaded in the filter framework and operates on a callback mechanism to avoid significant disruption of I/O activity.

43 Claims, 12 Drawing Sheets

CUSTOMIZED DATA GENERATING DATA STORAGE SYSTEM FILTER FOR DATA SECURITY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

Embodiments of the present invention relate to security for a data storage and retrieval system, and in particular, to security systems and methods involving filtering information in the data storage and retrieval system.

2. Description of Related Art

A data storage and retrieval system typically includes one or more specialized computers (variously referred to as file servers, storage servers, storage appliances or the like, and collectively hereinafter referred to as "filers"). Each filer has a storage operating system for coordinating activities between filer components and external connections. Each filer also includes one or more storage devices, which can be connected with other filers, such as via a storage network or fabric. Exemplary storage devices include individual disk drives, groups of such disks and redundant arrays of independent (or inexpensive) disks (RAID groups). The filer is also connected via a computer network to one or more clients, such as computer workstations, application servers or other computers. Software in the filers and other software in the clients cooperate to make the storage devices, or groups thereof, appear to users of the workstations and to application programs being executed by the application servers, etc., as though the storage devices were locally connected to the clients.

Filers can also perform other services that are not visible to the clients. For example, a filer can treat all the storage space in a group of storage devices as an "aggregate." The filer can then treat a subset of the storage space in the aggregate as a "volume."

Filers include software that enables clients to treat each volume as though it were a single storage device. The clients issue input/output (I/O) commands to read data from or write data to the volume. The filer accepts these I/O commands; ascertains which storage device(s) are involved; issues I/O commands to the appropriate storage device(s) of the volume to fetch or store the data; and returns status information or data to the clients.

Typically, the filer manages storage space on the storage devices on a per-volume basis. Disk blocks, which represent contiguous physical units of storage, are composed of a number of bytes and are used as the fundamental storage constructs to store files. A file may be represented as a number of blocks of storage, depending upon the size of the file. The filer keeps track of information related to the volume, files and blocks. For example, the filer tracks the size of the volume, the volume owner, access protection for the volume, a volume ID and disk numbers on which the volume resides. The filer also keeps track of directories, directory and file owners and access protections.

Additional information about files maintained by the filer may include file names, file directories, file owners and protections, such as access rights by various categories of users. The filer may also track file data for reference purposes, which file data may include file handles, which are internal file identifiers, and read offsets and read amounts, which determine location and size of a file. The filer also tracks information about blocks that store data and make up files. For example, the filer may track blocks that are allocated to files, blocks that are unallocated, or free to be used, as well as information about the blocks. In addition, the filer may track internal block data such as block checksums, a block physical location, a block physical logical offset, as well as various special purpose blocks.

An example of a special purpose block is a superblock, which contributes to mounting a volume, where the superblock includes all the information needed to mount the volume in a consistent state. The superblock contains a root data structure commonly known as an index node ("inode"), from which a tree of inodes are located and used to locate other blocks in the volume. The superblock contains information about the volume, such as volume configuration or a volume ID. The volume information may be read into a cache when a given associated volume is mounted.

The above-described information tracked by the filer collectively constitutes a "file system," as is well-known in the art. For example, the filer can implement the Write Anywhere File Layout (WAFL®) file system, which is available from Network Appliance, Inc. of Sunnyvale, Calif. Alternatively, other file systems can be used.

According to the exemplary WAFL file system, storage space on a volume is divided into a plurality of 4 kilobyte (KB) blocks. Each block has a volume block number (VBN), which is used as an address of the block. Collectively, the VBNs of a volume can be thought of as defining an address space of blocks on the volume.

Each file on the volume is represented by a corresponding inode. Files are cataloged in a hierarchical set of directories, beginning at a root directory. Each directory is implemented as a special file stored on the same volume as the file(s) listed in the directory. Directories list files by name (typically alphabetically), to facilitate locating a desired file. A directory entry for a file contains the name of the file, the file ID of the inode for the file, access permissions, etc. The collection of directory names and file names is typically referred to as a name space. Various name spaces may be created that have specific purposes, where each name space has a root directory called a "metaroot."

The inodes, directories and information about which blocks of the volume are allocated, free, etc., collectively form system information metadata. An allocated block is one that is assigned to store specific data, while a free block is one that is unallocated and available to be assigned to store specific data. The metadata may be public or private, that is, being typically made available to users or not. Some metadata is stored in specially named files stored on the volume and, in some cases, in specific locations on the volume, such as in a "volume information block," as is well known in the art. When one or more blocks are to be retrieved from disk, the operating system may retrieve the blocks to a system cache, to satisfy an I/O request made by a client. The operating system executes a routine to communicate with appropriate device drivers to cause the desired blocks to be read from the storage device(s) into the cache.

Some storage operating systems implemented in filers include a capability to take "snapshots" of an active file system. A snapshot is a persistent point in time image of the active file system that enables quick recovery of data after data has been corrupted, lost, or altered. Snapshots can be created by copying the data at each predetermined point in time to form a consistent image. Snapshots can also be created virtually by using a pointer to form the image of the data. A snapshot can also be used as a storage space-conservative mechanism, generally composed of read-only data structures that enables a client or system administrator to obtain a copy of all or a portion of the file system, as of a particular time in the past, i.e. when the snapshot was taken.

As part of ordinary operation of the network storage system, the operating system employs file system filters to realize certain features. Filters may perform tasks related to filer operations, including the storage and retrieval of information. Filter operations may include permitting or preventing access to files or file metadata, for example. Filter tasks may include capturing backup information for preserving data or data transfer or conversion, as may be the case during migrations or upgrades. Examples of file system filters include antivirus products that examine I/O operations for virus signatures or activity, user access permissions, encryption products and backup agents.

File system filters are typically organized as kernel-mode applications that are dedicated to a specific purpose. The file system filter is typically arranged in the I/O data path, to permit the filter to intercept I/O requests and responses. This configuration for a file system filter exhibits several drawbacks, including impacting control flow for I/O operations, little or no control of filter sequence or load order and systematic issues with filters being attached to the operating system kernel. There is also typically no convention with respect to filter construction, so that the filters arranged in a sequence may conduct operations that cause conflicts or errors in the operating system, potentially leading to crashes. Filters may also be constructed to generate their own I/O requests, and may be reentrant, leading to stack overflow issues and significant performance degradation. There may be redundancy among groups of filters for common operations, such as obtaining file/path names, generating I/O requests or attaching to mounted volumes and redirectors, as well as buffer management. Some of these common tasks are performed inconsistently among the various filters, leading to inefficiency and performance degradation.

File system filter architectures have been proposed to overcome some of the above-described drawbacks. According to one configuration, a filter manager is provided between an I/O manager and data storage devices. The filter manager provides services for execution of filter functions while overcoming some of the above-described drawbacks. For example, the filter manager can provide a filter callback architecture that permits calls and responses rather than chained dispatch routines. A call to a filter invokes the filter, often with passed parameters, while a callback represents instructions passed to the filter for execution, often to call other procedures or functions. For example, a callback to a filter may be in the form of a pointer to a function or procedure passed to the filter. The filter manager can also provide uniform operations for common tasks such as generating I/O requests, obtaining file/path names, managing buffers and attaching to mounted volumes and redirectors. In addition, the filter manager can maintain a registry of filters and their specific functionality requirements, such as specific I/O operations. By maintaining a registry of filters, the filter manager can load and unload filters with consistent results and states. In addition, the filters can be enumerated for various filter management functions.

There are several challenges that are not addressed by the above-described filter manager in a file system connected through a network. For example, the above-described filter manager is specific to a local filer, where all requests and responses represent local file access activity. Accordingly, the above-described filter manager is unable to take advantage of available information contained in the request that might indicate request source or aid in request processing. In addition, the above described filter manager is file based, and thus unable to provide filtering services for other types of access methods. For example, one type of advantageous data access protocol operates on a block basis, rather than a file basis. Data access protocols such as iSCSI and Fiber Channel permit direct access to data blocks in a file system, and are unrecognized by the above-described local filer and filter manager. The filter manager is also unable to identify external sources or addresses for requests and responses that might aid in request processing, such as are available in the IP protocol, for example. The filter manager is unable to pass high level protocol information to filters through the filter architecture to obtain the advantages that might be possible with the additional information available for processing requests and responses by the filters. Accordingly, the filter manager does not have context information for the request or response to be processed. Context information refers to information known to a particular object, such as a filter, that the object can use or produce as a result of object processing. For example, CIFS and NFS file protocol based requests include a client source address, which can provide a context for a filter processing the request or response. The above described filter manager does not provide such a context, for example.

In addition, the filter manager is a kernel-mode application, and is synchronous to the extent that the filter manager has limitations related to processing threads that must not act to preserve data or I/O operations in the event of a load or unload command.

One important aspect of managing filer operations involves security of the filer and the data stored within the file system. One approach to implementing security in a filer involves assigning protections to various files, directories or categories of data in the file system. For example, files, directories or data may be assigned permissions individually or as a group, such as by being located in a particular directory that has specific permissions. Alternately, or in addition, users may be assigned to specific groups that have a defined access to certain files, directories or data. Users that are not part of the group do not have the same access permissions to the files, directories, or data. Individual files or directories may also be assigned permissions to permit or prevent access by individual users or groups of users. Access to a file system often occurs over a network that connects multiple users with multiple data storage devices organized by filers. Networks typically require access permissions through logins that identify a user and provide security in the form of the requirement of an authorized user ID and/or password.

At times, intruders may attempt to access the network or connected file system without authorization. Intruders may adopt a number of different techniques to attempt to gain access to the network or file system, for example by impersonating an authorized user, attempting to overcome security provisions, such as logins or access permissions, or by modifying security data to obtain access to the network or file system. One difficulty identified in security for a file system is the fact that by denying access to an intruder through one or more security provisions, the intruder is able to improve their knowledge of the security features of the network or file system. As the intruder attains greater knowledge about the security of the network or file system, they are more likely to successfully gain unauthorized access.

SUMMARY OF THE INVENTION

Embodiments of the present invention provide a security filter in a file system that generates a substitute response to a user request when the filter identifies an unauthorized access attempt. The security filter detects patterns of access denial to a file system and suspicious events associated with unauthorized intrusions into the file system. Security event definitions determine when a set of events trigger identification of an intruder. A trap manager reviews identified intrusions and causes traps to be installed based on triggering from the security event definitions. A trap is an event oriented redirection of process flow organized by the security filter to capture and redirect a file system event. For example, a data error produced by a disk storage device can be captured by a trap installed by the security filter, which redirects process flow to respond to the error. The trap manager also manages traps installed to capture data associated with the identified intrusions. A trap mechanism installs traps under control of the trap manager to intercept responses returned from a storage device before the responses are sent to the intruder. The responses from the storage device include errors such as access denied messages. Upon intercepting a response from the storage device, the security filter provides a substitute response in place of the original response to obscure the operation of the files system from the intruder. The substitute response may take a number of forms and include a variety of data.

The security filter can generate artificial data in response to being triggered, which data may include artificial files or directories, for example. A data generator provides artificial data that may be arranged as a simple pattern, or derived from actual data to represent content of a file. The generated data can be customized depending upon the detected intrusion or the data requested that caused the trap action. The security filter can also identify an intruder with an indication that can be used to implement actions particular to the user marked as an intruder.

In accordance with an exemplary embodiment of the present invention, the security filter may be implemented within a filter framework that provides a structured implementation of a filter system for a file system. The filter framework may be implemented as a single binary that is "hooked into" or coupled to the filer in one or more of a variety of locations. A single binary executable application is a stand-alone instruction code that can be compiled as a separate module, for example. The locations for hooking the filter framework include points in a dataflow, such as at a client interface, a protocol interface, a network interface or a messaging interface for communicating with storage devices. The filter framework provides a queue for each point at which the filter framework is coupled to the filer. The queues are maintained on a volume basis. The queues maintain filter call identifiers to enable filters to intercept data in the data path for the point at which the filter framework is coupled to the filer. A filter controller is provided to capture request and responses for file system data and invoke applicable filters. The filter controller may invoke filters according to several different invocation models, including synchronous, asynchronous and asynchronous release configurations. The use of a synchronous model causes the filters associated with the filter controller to hold incoming I/O and block the calling thread until execution completes. An asynchronous configuration causes the filter to hold incoming I/O until execution completes, but releases the calling thread. The asynchronous release configuration causes the filter to execute without blocking incoming I/O or the calling thread.

According to an exemplary feature of the present invention, the security filter registers with the filter framework to be called in synchronous mode. Various security filter embodiments may be constructed that take advantage of asynchronous or asynchronous release modes, which modes may be implemented to avoid blocking I/O data paths or calling threads. In addition, the security filter can track and log an event history of an intruder that may be used for further analysis. The security filter can also initiate an alarm depending upon the type of trap and the implemented policies.

The security filter may be loaded or unloaded in the filter framework. The security filter is arranged with other filters in a particular order for callback operations, based on, for example, priority. A callback represents instructions passed to the security filter for execution, often to call other procedures or functions. For example, a callback to the security filter may be in the form of a pointer to a function or procedure passed to the filter. The security filter can produce I/O operations, with each filter I/O being provided with a tag for identification. The filter I/O tagging permits the filter framework to identify the originating filter of the filter I/O. One advantage to providing filter I/O tagging is to avoid conflicts that may occur with multiple I/O requests from a single filter source. In addition, filter I/O tagging contributes to permitting the filter framework to determine if the filter I/O has a particular priority, based on the filter priority. Filters with higher priority can potentially receive a greater time slice of available processing time. Accordingly, by tagging the filter I/O, the filter framework can allocate processing time to I/O requests more appropriately.

In an exemplary embodiment of the present invention, the filter framework includes an I/O map and an event map that contribute to determining when and how a registered filter should be called. The I/O map is a data structure that holds identifiers for filters and I/O operations for which the filters are registered. The identifiers are used to provide the registered callbacks for the registered filters, while the event map provides information concerning when a particular callback is made. The event map is a data structure that holds identifiers for filters and filter characteristics, such as an indication of whether a filter is a remote filter. A filter call results from an evaluation of an expression that involves information taken from the I/O map and the event map. The determination of when and how to call a filter can be advantageous when filter calls generate significant amounts of control traffic in the filter framework or filer.

The filter controller invokes the filters through a request callback mechanism on an incoming path, and through a response callback mechanism on a return path. The request and response callbacks are registered with the filter controller to permit an organized callback mechanism and progression. A request or response that causes a filter to be invoked involves the use of a particular data structure for each I/O operation. The data structure may include system call parameters or dedicated protocol components for internal file system operations. The filters may be operable in a kernel space or a user space, with associated support being provided in the filter framework for kernel mode or user mode filter applications. Kernel mode filters can take advantage of the filter framework being coupled to the filer at various points to interact with filer components at the various points. The points at which the filter framework is coupled to the filer that permit kernel mode filter interaction include locations within or before a protocol server, between the protocol server and a messaging interface for communicating with data storage devices or located between the messaging interface and the data storage devices. The kernel mode filters can thus be single source based, and compiled once, but placed into the filer at different points of interaction. User mode filter applications can be of two types, local user mode filters and remote user mode filters. The security filter is a kernel mode filter due to the sensitive nature of data being processed. The filters typically are associated with a particular volume or snapshots for a particular volume.

According to an aspect of the present invention, a resource manager is made available for handling a variety of filter functions. The resource manager provides resources at both a user level and a kernel level.

According to an exemplary embodiment of the present invention, a filter controller is interposed in a messaging path between a storage control module and a storage device. The filter controller intercepts messages or requests from the storage control module and invokes the security filter through a request callback. The security filter includes a request handler that processes the request to determine if a security event has occurred. The intercepted request is forwarded to the storage device(s) after security policy and trap processing. Security policy processing includes evaluating security events to determine if an unauthorized access attempt has been made, and if so, whether to install a trap. Security filter processing also includes managing traps and the trap responses. The storage device returns a response prompted by the request that is also intercepted by the filter controller. The filter controller then invokes the security filter with a response callback. In addition, the security filter can trap an access denied response from the storage device(s). The security filter also includes response handlers to process the response. Both the request handlers and the response handlers in the security filter may provide a status to permit a return from the request or response callback, to permit other filters to be called or to generally return status information to the filter controller.

According to another exemplary embodiment, the filter framework is interposed between a protocol interface front end and a protocol interface back end to permit protocol conversions to occur before filters related to requests and responses are invoked. According to another exemplary embodiment, the filter framework is interposed between a client and a protocol interface so that client requests and responses cause filter invocations within the protocol being used by the client. The filter framework can perform protocol conversion and pass the requests and responses between the client and the protocol interface.

The filter framework provides a number of features, including filter loading and unloading. A filter loader registers a filter with the filter controller and identifies resources to be used for filter operations. The filter framework can freeze I/O during loading and unloading or starting and stopping a given filter. For example, the filter framework can maintain a buffer to permit filter related I/O to be halted and stored while the filter changes state, such as from "loaded" to "started." The filter loader also provides a counter for each filter to permit tracking of I/O operations in the event of a filter unload. The filter framework tracks filter I/O and completes processing of the filter I/O prior to unloading. The counter maintained for each filter counts down to zero to indicate all I/O processing has been completed, and that the filter is ready for unloading. The filter loader also provides I/O tagging, so that filter I/O requests and responses can be identified to avoid conflicts.

The present filter system is not limited to file systems that include operating systems, but applies to storage systems in general. The security filter may be implemented within a file system, a driver for a storage system or in a storage device controller that causes the storage device to access the physical locations used to store data, for example. In general, the security filter is installed, configured and analyzed for security events, without significantly disrupting the flow of data to and from the storage device.

BRIEF DESCRIPTION OF THE SEVERAL VIEWS OF THE DRAWINGS

The present invention is described in greater detail below, with reference to the accompanying drawings, in which.

DETAILED DESCRIPTION OF THE INVENTION

The concepts of the file system filter for data security in accordance with the present disclosure derive support from a file system architecture with sophisticated mechanisms for storing, maintaining and retrieving data. A discussion of the filing system, or filer, in which an embodiment of the file system security filter is implemented follows below.

Figure 1:
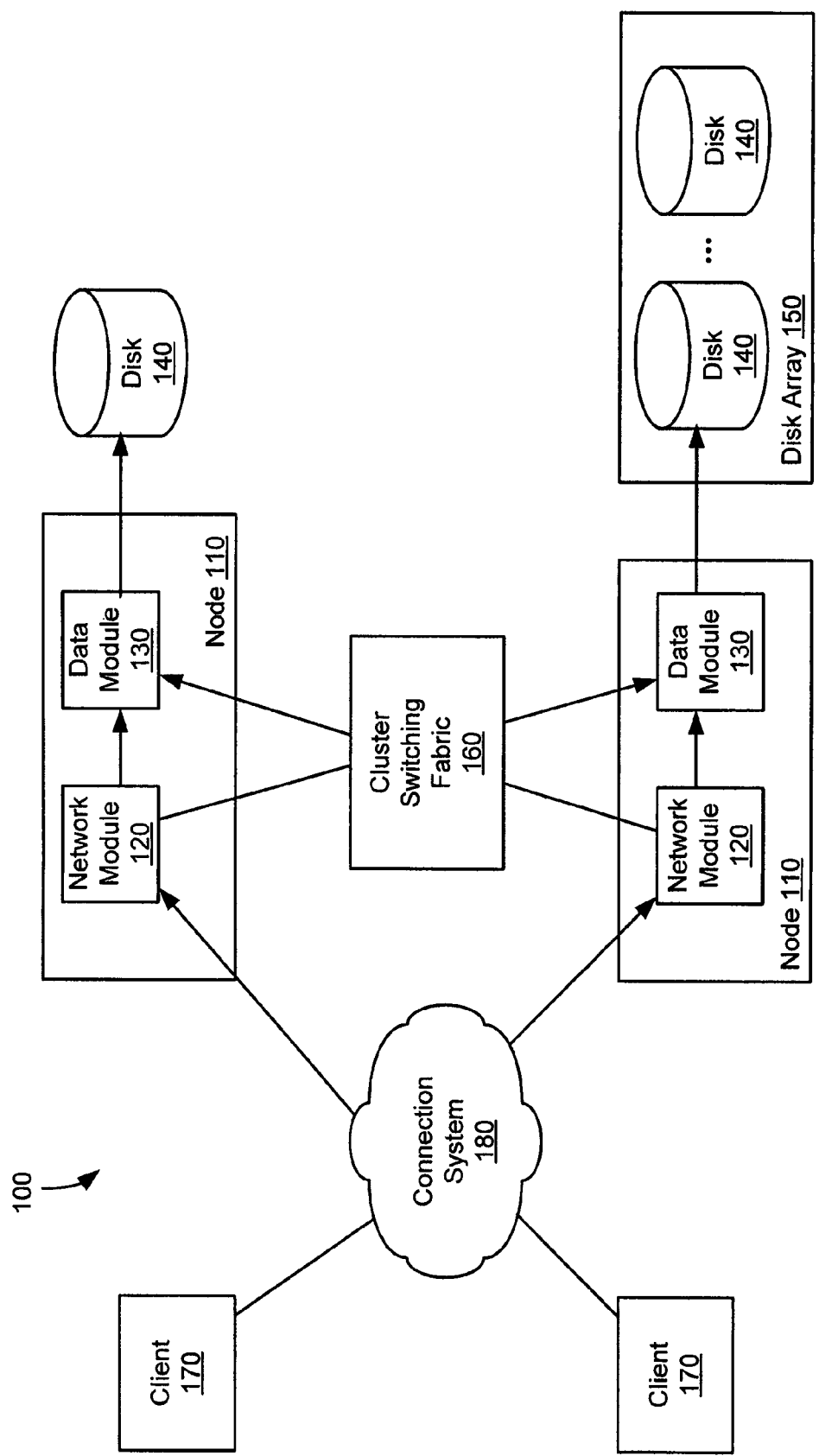
FIG. 1 is a diagram illustrating a cluster having a plurality of nodes.

FIG. 1 is a diagram illustrating a storage system cluster with a storage system architecture 100 having a plurality of nodes 110. Each node 110 is generally organized with a network module 120 and a data module 130. Network module 120 includes functionality that enables node 110 to connect to clients 170 over a connection system 180, while data modules 130 connect to one or more storage devices, such as disks 140 or a disk array 150. Nodes 110 are interconnected by a switching fabric 160 which may be embodied as a Gigabit Ethernet switch, for example. It should be noted that while there is shown an equal number of network and data modules in the illustrative architecture 100, there may be differing numbers of network and data modules in accordance with various embodiments of the present invention. For example, there may be a plurality of network and disk modules interconnected in a configuration that does not reflect a one-to-one correspondence between the network and data modules.

The clients 170 may be general-purpose computers configured to interact with the node 110 in accordance with a client/server model of information delivery. For example, interaction between the clients 170 and nodes 110 can enable the provision of storage services. That is, each client 170 may request the services of the node 110, and the node 110 may return the results of the services requested by the client 170, by exchanging packets over the connection system 180, which may be wire-based, optical fiber, wireless or combinations thereof. The client 170 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client 170 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
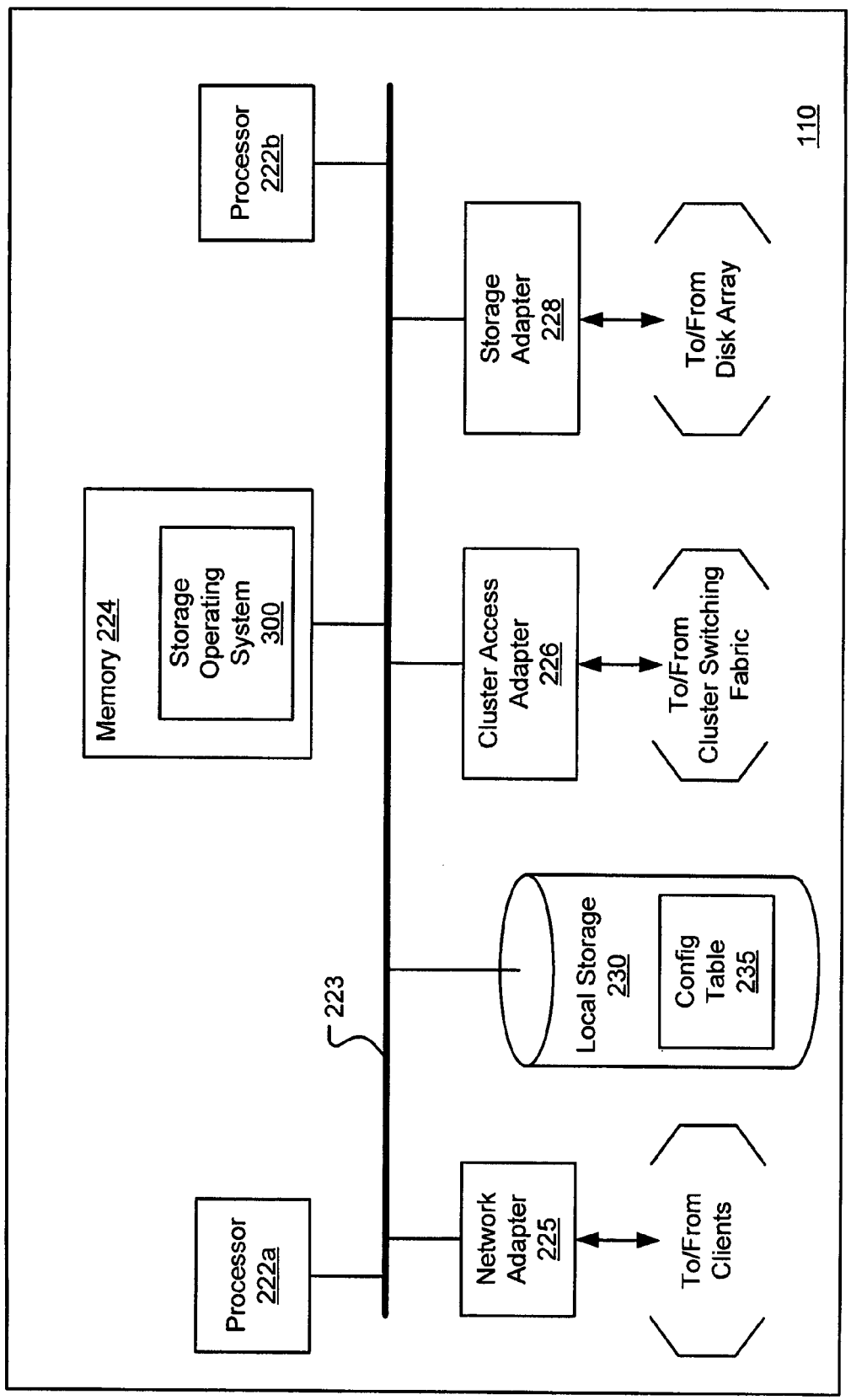
FIG. 2 is a diagram illustrating a node of the cluster.

FIG. 2 is a diagram illustrating further details of node 110 of architecture 100. Specifically, node 110 is illustratively embodied as a storage system comprising a plurality of processors 222a,b, a memory 224, a network adapter 225, a cluster access adapter 226, a storage adapter 228 and local storage 230 interconnected by a system bus 223. Local storage 230 comprises one or more storage devices, such as disks 140, that locally store configuration information in a configuration table 235, for example. Cluster access adapter 226 comprises a plurality of ports adapted to couple node 110 to other nodes 110 in architecture 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the network modules and data modules are implemented on separate storage systems or computers, cluster access adapter 226 is utilized by the network or data modules for communicating with other network or data modules in architecture 100.

Each node 110 is illustratively embodied as a dual processor storage system executing a storage operating system (OS) 300. Storage OS 300 preferably implements a high-level module, such as a file system, to logically organize the information as a hierarchical structure of named directories, files and blocks on the disks. However, it will be apparent to those of ordinary skill in the art that node 110 may alternatively comprise a single or more than two processor system. Illustratively, one processor 222a can execute the functions of a network module 310 on the node, while processor 222b can execute the functions of a disk module 350. It should also be appreciated that processors 222a,b may include multiple processing cores, thus improving the processing speed of processors 222a,b.

Memory 224 illustratively comprises storage locations that are addressable by the processors and adapters for storing software program code and data structures associated with the present invention. The processor and adapters may, in turn, comprise processing modules and/or logic circuitry configured to execute the software code and manipulate the data structures. Storage OS 300, portions of which are typically resident in memory and executed by the processing modules, functionally organizes node 110 by, inter alia, invoking storage operations in support of the storage service implemented by node 110. It will be apparent to those skilled in the art that other processing and memory means, including various computer readable media, may be used for storing and executing program instructions.

Network adapter 225 comprises a plurality of ports adapted to couple node 110 to one or more clients 170 over point-to-point links, wide area networks, virtual private networks implemented over a public network (Internet) or a shared local area network. Network adapter 225 thus may comprise mechanical, electrical, optical or other connection and signaling components to connect node 110 to a network. Illustratively, connection system 180 may be embodied as an Ethernet network or a Fibre Channel (FC) network. Each client 170 may communicate with node 110 over connection system 180 by exchanging discrete frames or packets of data according to pre-defined protocols, such as TCP/IP.

Storage adapter 228 cooperates with storage OS 300 executing on node 110 to access information requested by clients 170. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 140 of disk array 150. Storage adapter 228 comprises a plurality of ports having input/output (I/O) interface circuitry that couples to the disks over an I/O interconnect arrangement, such as a conventional high-performance, FC link topology.

Storage of information on each disk array 150 is preferably implemented as one or more storage volumes that comprise a collection of physical storage disks 140 cooperating to define an overall logical arrangement of volume block number (VBN) space on the volume(s). Each logical volume is generally, although not necessarily, associated with its own file system. Disks 140 within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to disks 140, storage OS 300 implements a write-anywhere file system that cooperates with one or more virtualization modules to "virtualize" the storage space provided by the disks 140. A file system 360 logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Storage OS 300 provides a processing architecture for implementing the file system, and includes a variety of components typically found in a sophisticated operating system processing. For example, the processing of OS 300 is divided into different modes, a kernel mode and a user mode. The kernel mode processing takes advantage of a kernel space, while the user mode processing takes advantage of a user space. The kernel space and user space interact to pass information for processing within the different modes, and typically the modes are maintained separately. One reason for maintaining the separate modes is security for the file system.

Kernel mode operations are typically configured as internal or system oriented operations, while user mode operations are typically undertaken by applications and user accesses. Often, an application or user submits a request in user mode, which prompts a system call that is handled in kernel mode, with the response transferring information from the kernel mode operations to the user mode operations.

Processing in OS 300 typically involves interaction between a number of processes, each with their own resources, such as address space and state information. Processes typically operate in OS 300 in kernel mode, and provide system oriented operations, such as calls to hardware devices. Processes typically do not interact with each other, except through system-provided inter-processes communication mechanisms.

Processing threads are operational sequences for program execution that may execute in parallel with each other. Processes typically have one or more threads associated with their operation to carry out one or more tasks assigned to the process. In the case of a single processor with a single core or computing engine, multiple threads may be executed in parallel through multitasking architectures such as time slicing or event oriented processing. A single processor with a single core executes multiple threads by switching between the threads at specified points, so that the processing of multiple parallel threads is not literally simultaneous. In the case of multiple processors or a processor with multiple cores, multiple threads may be processed literally simultaneously, as may be the case in node 110 with processors 222*a, b,* as shown in FIG. 2.

Multiple threads may be formed in an application that operates in user mode. Threading implemented by application programs often relies on self-governance to permit interruption of threads or thread switching. Unlike typical process configurations, threads may typically share state information, address space or other resources directly. Context switching between threads is typically very fast in comparison to context switching between processes. Context switching refers to the saving or transfer of state information related to a given thread so that another thread can install state information to provide a context for that thread. In the case of multiple processors or cores, threads may execute concurrently, which, while advantageous, can lead to challenges in synchronization. For example, while different threads may work on different tasks simultaneously, processing or data in one thread may rely on a result from another thread. Accordingly, concurrently executing threads often are coordinated or synchronized to attain proper overall execution. A mechanism may be used to prevent a thread from continuing processing until another thread reaches a specified point, to permit correct data manipulation or to prevent attempts at simultaneous modification of common data. Such mechanisms for preventing simultaneous access to resources such as data are often referred to as locks. Accordingly, one thread may lock access to a resource until processing completes, at which point the resource may be accessed by another thread.

Threads that operate in user mode sometimes issue system calls that block the called resource. For example, a thread may request resources for performing I/O, which is often performed synchronously. Synchronous I/O operations involve system calls that typically do not return until the I/O operation has been completed. Waiting for the system call to return can block the thread or entire process that is awaiting execution by the thread. In addition, other threads in the same process are prevented from being executed. Techniques to overcome the effects of blocking system calls include the use of a synchronous interface that uses non-blocking I/O internally, or structuring a program to avoid the use of synchronous I/O or other types of blocking system calls.

Threads also typically use locks for resources including data that should not be accessed while being processed or manipulated. The lock will permit a thread to obtain access to the resource, excluding all other threads or processes. Managing locks on resources or data can be made the responsibility of the threads requesting the resource or data. In addition, or alternatively, the use of locks for resources accessed by multiple threads may be managed by a separate scheduling thread or process.

In the illustrative embodiment, processes and threads are implemented in storage OS 300, which is preferably the NetApp® Data ONTAP®, operating system available from Network Appliance Inc., of Sunnyvale, Calif. Storage OS 300 thus preferably implements a Write Anywhere File Layout (WAFL®) file system. However, it is expressly contemplated that any appropriate storage operating system may be enhanced for use in accordance with the inventive principles described herein. As such, storage OS 300 should be taken broadly to refer to any storage operating system that is otherwise adaptable to the teachings of this invention.

Storage OS 300 comprises a series of software layers organized to form an integrated network protocol stack or, more generally, a multi-protocol engine 325 that provides data paths for clients 170 to access information stored on the node 110 using block and file access protocols. The multi-protocol engine 325 includes a media access layer 312 of network drivers, for example, gigabit Ethernet drivers, that interfaces to network protocol layers, such as an IP layer 314 and supporting transport mechanisms, a TCP layer 316 and a User Datagram Protocol (UDP) layer 315. A file system protocol layer provides multi-protocol file access and, to that end, includes support for a Direct Access File System (DAFS) protocol 318, an NFS protocol 320, a CIFS protocol 322 and a Hypertext Transfer Protocol (HTTP) 324. A VI layer 326 implements the VI architecture to provide direct access transport (DAT) capabilities, such as RDMA, as required by DAFS protocol 318. An iSCSI driver layer 328 provides block protocol access over the TCP/IP network protocol layers, while an FC driver layer 330 receives and transmits block access requests and responses to and from node 110. The FC and iSCSI drivers provide FC-specific and iSCSI-specific access control to the blocks and manage exports of luns to iSCSI or FCP components.

Storage OS 300 may establish a session using one of the above-described protocols to form a connection between a client and node 110. The session may rely on a session layer of one of the network protocols discussed above, for example, through Telnet or FTP. The session implementation can be maintained by a higher level program, such as storage OS 300.

In addition, storage OS 300 includes a series of software layers organized to form a storage server 365 that provides data paths for accessing information stored on the disks 140 of architecture 100. Storage server 365 includes a file system module 360 for managing volumes 310, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage OS 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 110. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks 140. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system having an on-disk format representation that is block-based using, e.g., 4 kilobyte (kB) blocks and using modes to identify files and file attributes (such as creation time, access permissions, size and block location). The file system uses files to store some metadata, such as that describing the layout of its file system; these metadata files include, among others, an mode file. A file handle, i.e., an identifier that includes an mode number, is used to retrieve an mode from disk.

Operationally, a request from the client 170 is forwarded as a packet over the connection system 180 and onto the node 110 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 140 if it is not cached, or resident "in core", i.e., in memory 224. If the information is not in memory, the file system 360 indexes into the mode file using the mode number to access an appropriate entry and retrieve a logical VBN. The file system 360 then passes a message structure including the logical VBN to the RAID system 380; the logical VBN is mapped to a disk identifier and disk block number (disk, dbn) and sent to an appropriate driver (e.g., SCSI) of the disk driver system 390. The disk driver accesses the dbn from the specified disk 140 and loads the requested data block(s) in memory for processing by the node. Upon completion of the request, the node 110 (and operating system) typically returns a response to the client 170 over the connection system 180.

As described in greater detail below, a file system filter may be implemented in accordance with the present invention in node 110 to intercept the client request and data storage response. Portions of the file system filter may be implemented at various locations within the filer architecture, such as at protocol conversion points or disk access points. The file system filter establishes software hooks in storage OS 300 for connecting the file system filter to the filer to take advantage of the above described filer features.

It should be noted that the software "path" through the storage operating system layers described above used to perform data storage access for the client request received at node 110 may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 110 in response to a request issued by the client 170. Moreover, the processing modules of adapters 225, 228 may be configured to offload some or all of the packet processing and storage access operations, respectively, from processor 222, to thereby increase the performance of the storage service provided by the node 110. It is expressly contemplated that the various processes, architectures and procedures described herein can be implemented in hardware, firmware or software, and may use storage media that includes various types of read only, random access and disk storage.

As used herein, the term "storage operating system" generally refers to the computer-executable code operable on a computer to perform data storage and retrieval functions and manage data access and may, in the case of a node 110, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. For example, the filter of the present invention can be implemented in a device driver for controlling I/O for a storage device. Alternately, or in addition, the filter can be implemented in a disk controller that causes the disk to access the physical locations used to store data. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

In an illustrative embodiment, the storage server 365 is embodied as data module 130 of the storage OS 300 to service one or more volumes of the disk array 150. In addition, the multi-protocol engine 325 is embodied as network module 120 to (i) perform protocol termination with respect to a client issuing incoming data access request packets over the connection system 180, as well as (ii) redirect those data access requests to any storage server 365 in architecture 100. Moreover, the network module 120 and data module 130 cooperate to make architecture 100 a highly-scalable and distributed storage system. To that end, each module includes a cluster fabric (CF) interface module 340a,b adapted to implement intra-cluster communication among the modules, including data module-to-data module communication for data container striping operations.

The protocol layers, e.g., the NFS/CIFS layers and the iSCSI/FC layers, of the network module 120 function as protocol servers that translate file-based and block based data access requests from clients into CF protocol messages used for communication with the data module 130. That is, the network module servers convert the incoming data access requests into file system commands that are embedded within CF messages by the CF interface module 340 for transmission to the data modules 130 in architecture 100. It is these file system commands that are used by the file system filter of the present invention to achieve filtering functions in accordance with filter definitions. Moreover, the CF interface modules 340 cooperate to provide a single file system image across all data modules 130 in architecture 100. Thus, any network port of a network module 120 that receives a request from client 170 can access any data container within the single file system image located on any data module 130 of architecture 100.

Further to the illustrative embodiment, network module 120 and data module 130 are implemented as separately-scheduled processes of storage OS 300; however, in an alternate embodiment, the network and data modules may be implemented as pieces of code within a single operating system process. Communication between a network module 120 and data module 130 is thus illustratively effected through the use of message passing between the network and data modules although, in the case of remote communication between a network module 120 and data module 130 of different nodes, such message passing occurs over the cluster switching fabric 160. A known message-passing mechanism provided by the storage operating system to transfer information between network and data modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). An example of such an agnostic protocol is the SpinNP protocols available from Network Appliance, Inc.

In accordance with the present invention, a file system filter framework is arranged in the above described filer within node 110. The filter framework may be arranged in a number of configurations to take advantage of the features of the filer component features described above.

Figure 4A:
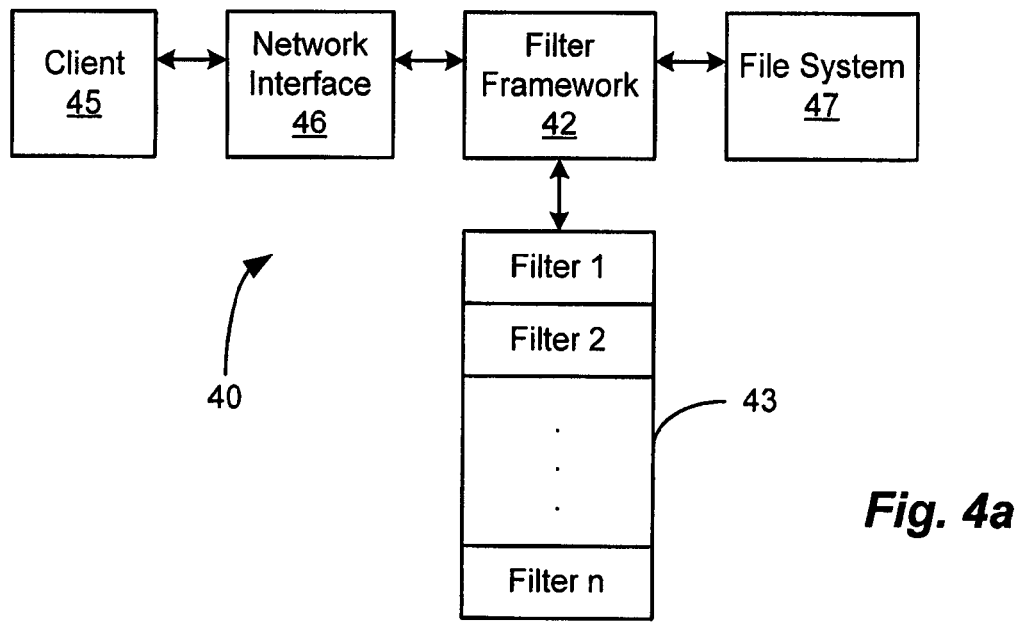
FIGS. 4a and 4b are block diagrams illustrating abstract locations of a filter framework within a network connected filer.
Figure 4B:
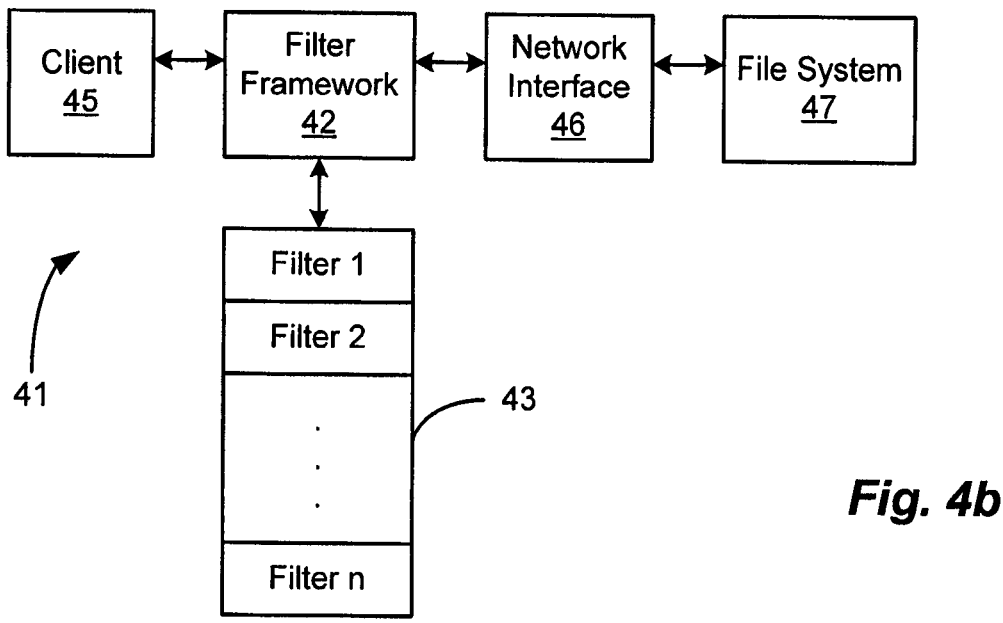

According to an embodiment of the present invention, a filter framework or architecture is provided for filter operations related to data access requests and responses to and from a filer. Referring to FIGS. 4a and 4b, filer systems 40 and 41 are shown, which include a file system 47. A filter framework 42 and filters 43 operate to provide filtering functions for filer systems 40 and 41. A client 45 provides requests for information from file system 47, and receives responses that may include data maintained in file system 47, or information about the data. The request and response for client 45 is directed through a network interface 46, which supports network addressing to route the request and response between client 45 and file system 47, as described above with reference to multi-protocol engine 325.

Figure 3:
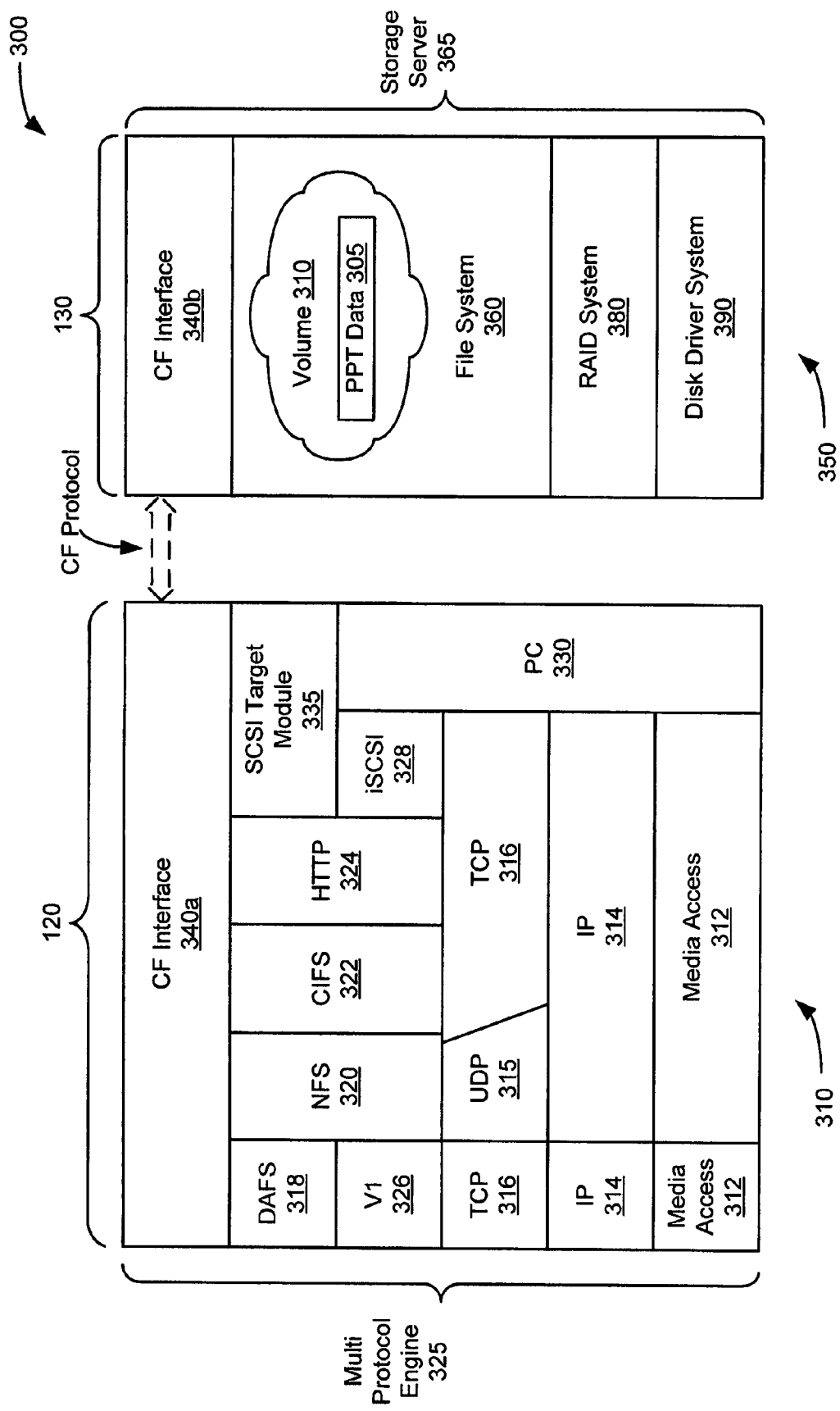
FIG. 3 is a diagram further illustrating a storage operating system.

File system 47 can be implemented as file system 360 illustrated in FIG. 3. File system 47 receives requests and provides responses with the same mechanisms as file system 360, as described more fully above. Filter framework 42 intercepts requests and responses and invokes one or more of filters 43 in accordance with the request or response information. The present invention may also provide various components to realize filter functions, some of which may be represented as being located in file system 47, or between components of file system 47, as described in great detail below.

Filter framework 42 is implemented in node 110, and may be realized as part of storage OS 300 shown in FIG. 2. Accordingly, processors 222a,b may execute instructions related to filter operations. In addition, as illustrated in FIGS. 4a, 4b, filter framework 42 can be represented as being located in the data path prior to or after network module 310, shown in FIG. 3. Components of the network filter system can be implemented in disk module 350 to permit direct filter access to requests and responses for file system 47, as discussed in greater detail below.

Figure 5A:
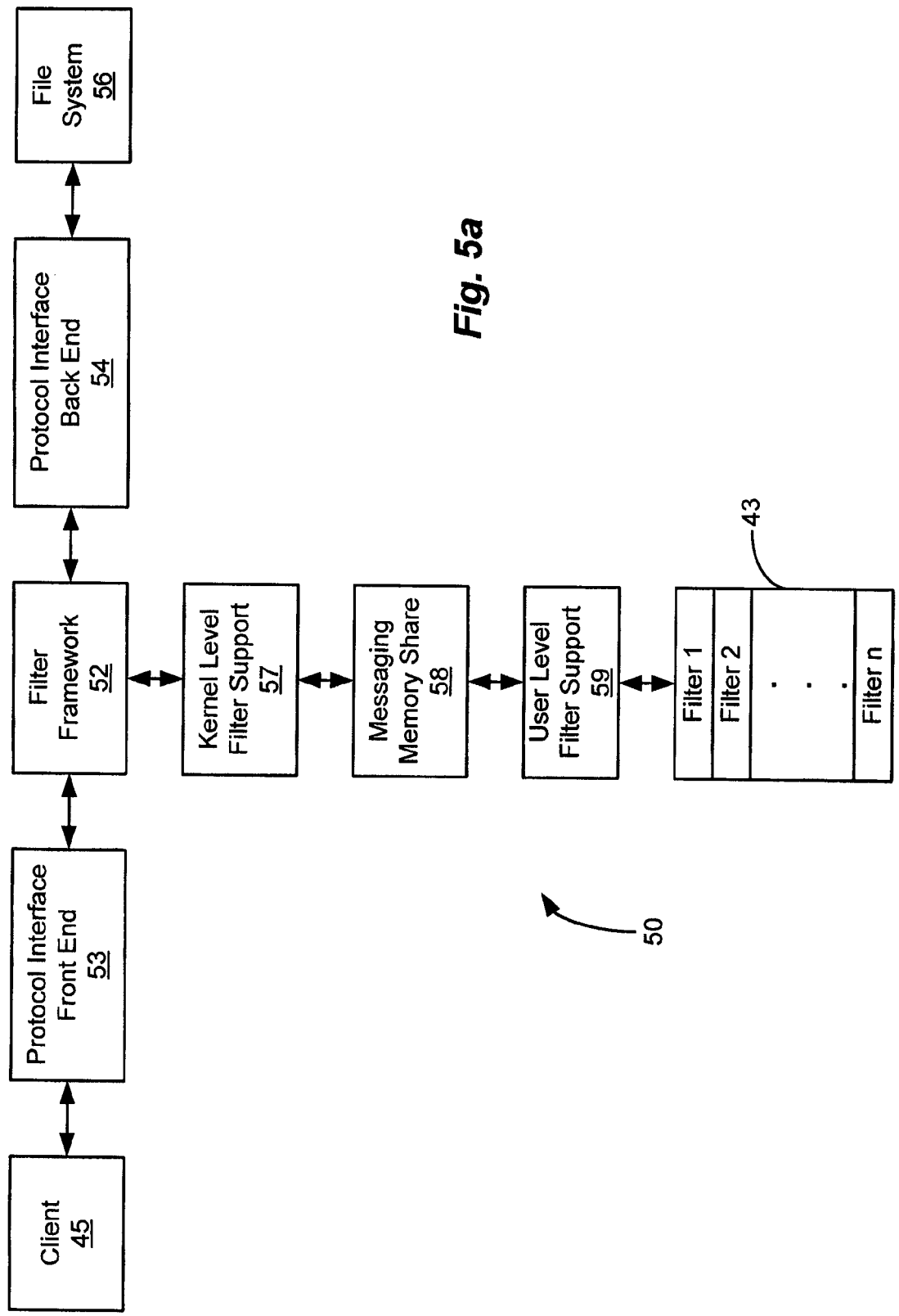
FIGS. 5a and 5b are block diagrams illustrating a filter framework interaction with a protocol interface.
Figure 5B:
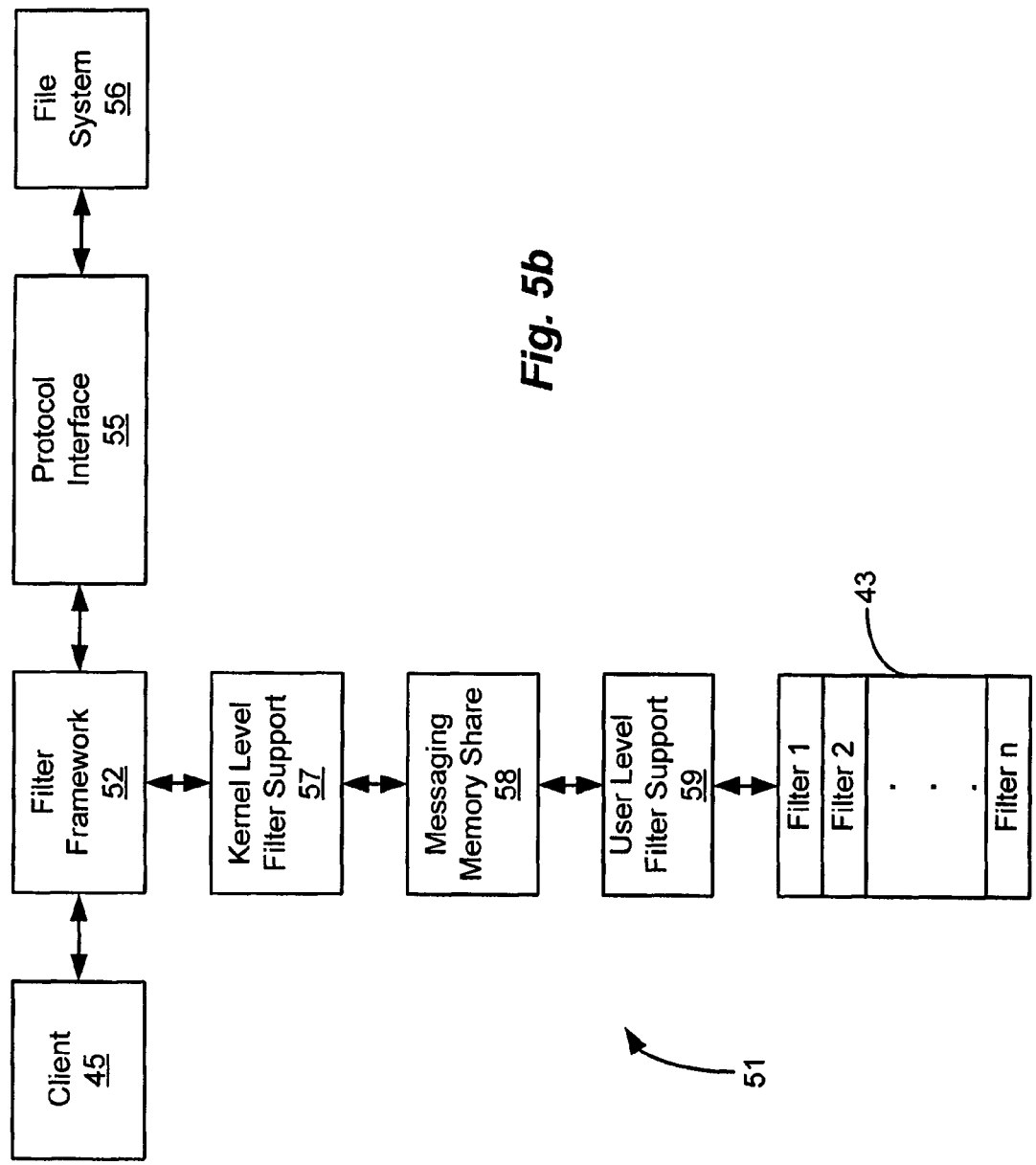

Referring now to FIGS. 5a and 5b, a dataflow 50 and 51 for embodiments of a network filter system architecture is shown. Dataflow 50 includes a protocol interface front end 53 and a protocol interface back end 54, between which is inserted a filter framework 52. Protocol interface front end 53 can be implemented as multi protocol engine 325 illustrated in FIG. 3, while protocol interface back end 54 can be implemented as CF interface module 340b of data modules 130. Accordingly, filter framework 52 is represented as being inserted between CF interface modules 340a,b to intercept system commands to data module 130, as well as to intercept responses from data module 130.

For data flows from client 45 to file system 56, dataflow 50 typically commences with a request from client 45, which request is delivered to protocol interface front end 53. Protocol interface front end 53 converts the request from the I/O request format into a system command, which is transferred to protocol interface backend 54 through filter framework 52. The system command is applied to file system 56 to generate a response. For data flows from file system 56, a system response from file system 56 is delivered to protocol interface back end 54, which response is then forwarded to protocol interface front end 53 through filter framework 52. Protocol interface front end 53 converts the internal system responses from protocol interface back end 54 to a protocol format suitable for transmission of the response data to client 45. Protocol interface front end 53 thus formats the system responses into standard file or block protocol forms, with the more typical file protocols being NFS and CIFS, and the more typical block protocols being iSCSI and FC. The request and responses being provided between client 45 and protocol interface front end 53 can be transmitted over an Ethernet or Fiber Channel network.

Filter framework 52 intercepts the system commands and responses between protocol interface front and back ends 53, 54 to perform filtering functions. Upon intercepting a command or response, filter framework 52 enumerates filters 43 to make a call to each one in a given order. Filters 43 can be cascaded, and some may be in kernel space, as supported by kernel level filter support 57, while other filters may be in user space, as supported by user level filter support 59. Kernel level filter support 57 and user level filter support 59 interact to pass information for processing within the separate kernel or user modes, where the kernel and user modes are generally maintained separately. Kernel mode operations are typically configured as internal or system oriented operations, while user mode operations are typically undertaken by applications and user accesses. A user mode filter submits a request in user mode, which prompts a system call through kernel level filter support 57, which system call is handled in kernel mode. The kernel mode response provides kernel mode information to kernel level filter support 57, which in turn delivers user mode responses to user level filter support 59 for use with user mode filters.

Filter framework 52 uses a call model that is dependent upon the operation mode available for the called filter. The call models include a synchronous mode, in which the filter holds incoming I/O, and blocks the calling thread until processing is completed. An asynchronous mode also holds incoming I/O until processing is completed, but releases the calling thread. An asynchronous release mode permits filter calls in which the filter does not block incoming I/O or the calling thread. FIGS. 5a and 5b illustrate arrangements for filter framework 52 that can use the synchronous mode or the asynchronous mode.

Filter framework 52 also receives, or intercepts, responses from a file system 56 in a return path. File system 56 can be implemented as file system 360 or 47, as described more fully above. The responses prompt filter framework 52 to enumerate filters 43 and invoke the appropriate filter response callback. A callback represents instructions passed to the filter for execution, often to call other procedures or functions. For example, a callback to a filter may be in the form of a pointer to a function or procedure that is passed to the filter. Filter framework 52 ensures that I/O is properly ordered and in a form appropriate for requests and responses. Filters 43 are also ordered or prioritized, and include predefined tags to identify any I/O generated by filters 43. The use of tags to identify I/O requests contributes to simplifying processing of the prioritized filters. The I/O request tags indicate the source filter for the I/O request, as well as the priority associated with the filter making the I/O request. Filter framework 52 can appropriately allocate processing time for the I/O requests in accordance with their priority, based on an examination of the associated I/O tags.

Kernel level filter support 57 provides support for kernel mode filters, as well as providing kernel level services for filters 43. For example, kernel level filter support 57 organizes the input of request/response parameters and provides communication and status support on a system level for user level filters and user level filter support 59. Kernel level filter support 57 provides status information to filter framework 52 related to the status of user level filter support 59 and user level filters located within filters 43.

Messaging memory share 58 is a communication device used to transfer data between kernel space and user space to contribute to supporting user level filters. The communication used by messaging memory share 58 can take a number of forms, including a specified shared memory, input/output control (IOCTL) or an IPC socket connection, as examples. The communication mechanisms are used to transfer parameters from kernel level filter support 57 to user level filter support 59, as well as to return status to kernel level filter support 57.

User level filter support 59 receives request/response parameters from kernel level filter support 57, enumerates user level filters and invokes user level filter callouts. User level filters in filters 43 register with user level filter support 59 to obtain request and response callbacks related to the filter operations. User level filters 43 can be located locally or remotely, depending upon their implementation. For example, a filter 43 can be located in the same file system node as OS 300. A filter 43 that is remotely located may be in another file system node 110, or in any remote filer or file system architecture 100 (FIG. 1), as well as in other external systems. Remote filters can be useful in implementing filter operations in systems with special purpose applications that are not typically implemented with OS 300. For example, an email application may use information from filer systems 40 or 41 (FIGS. 4a, 4b), and can implement filters for the information on a remote basis under control of the email application. In either case of local or remote filters, filters 43 register with user level filter support 59 to receive execution calls based upon request or response parameters. The calls may include arguments such as pointers to data structures related to the request or response.

The request parameters may include such components as file operation (read, write, etc.), file name and volume that are the target of the operation, file operation parameters, user credentials and time, as examples. The request parameters may also include the origin source, such as a source IP address, a source host name, CIFS export, NFS export, iSCSI or Fiber Channel related parameters. The response to user level filter support 59 may include parameters such as status and error codes, data from file system 56 in the case of a read operation, and attributes related to the data or the response.

The status provided to user level filter support 59 may include an error code, indicating an operation failure, as an example. The absence of an error code indicates success of an operation. The status may also indicate that filter processing should continue, or that the operation is pending, such as may be the case when a filter is awaiting the completion of further processing. The status may also indicate that further filter processing may be skipped. User level filter support 59 invokes user level filters included in filters 43 with a request or response callout. The various user level filters may provide status indications upon a request or response callout, as indicated above.

For control flow purposes, if the filter indicates a status of "return with error code" the call flow returns to user level filter support 59, which is processed through messaging memory share 58, to return flow to the original request from client 45, which may be pending in kernel level filter support 57. If the filter indicates a status of "continue," the callout returns to user level filter support 59, which can then call the next user filter in the filter order. If the filter indicates a status of "return with pending operation," user level filter support 59 holds the current operation and returns a status back to messaging memory share 58 and filter framework 52 to hold the filter callout, but release the calling thread back to protocol interface front end 53. When the pending operation of the filter is completed, the filter provides an indication to user level filter support 59 to resume filter callouts.

Once all filters 43 have been called and returned to user level filter support 59, a status is sent through messaging memory share 58 to signal kernel level filter support 57. Kernel level filter support 57 returns a status to filter framework 52 that indicates how filter framework 52 should further direct the control flow. For example, filter framework 52 can forward a current request to protocol interface back end 54 and to file system 56, depending upon whether permitted by the status returned to filter framework 52. Protocol interface back end 54 provides responses to filter framework 52, as provided by file system 56, which responses may include requested data or information about data in file system 56. Filter framework 52 can then initiate response callback processing, similar to the request callback processing described above. The response provided by file system is the source for initiating the response flow path, which ultimately provides a response to client 45.

The operations described above with respect to dataflow 50 in FIG. 5a are similar to those provided in dataflow 51 shown in FIG. 5b. Dataflow 51 illustrates filter framework 52 interposed between client 45 and protocol interface 55, rather than between a protocol interface front end 53 and protocol interface back end 54, as shown in FIG. 5a. Accordingly, protocol conversion is completed within protocol interface 55 to convert between local network protocols and internal system protocols. Filter framework 52 receives the external request and provides the eternal response with client 45. Accordingly, filter framework 52 intercepts network traffic with one or more of an Ethernet interceptor or Fiber Channel interceptor. Filter framework 52 in FIG. 5b can thus intercept network traffic from a network module 120, such as by intercepting communication from network adaptor 225 shown in FIG. 2. Filter framework 52 then converts NFS or CIFS requests and SCSI commands from iSCSI or Fiber Channel into a general request for use by protocol interface 55. Similarly, in the response flow path, filter framework 52 converts the return response from protocol interface 55 to forms usable with NFS or CIFS as well as SCSI commands.

Figure 6A:
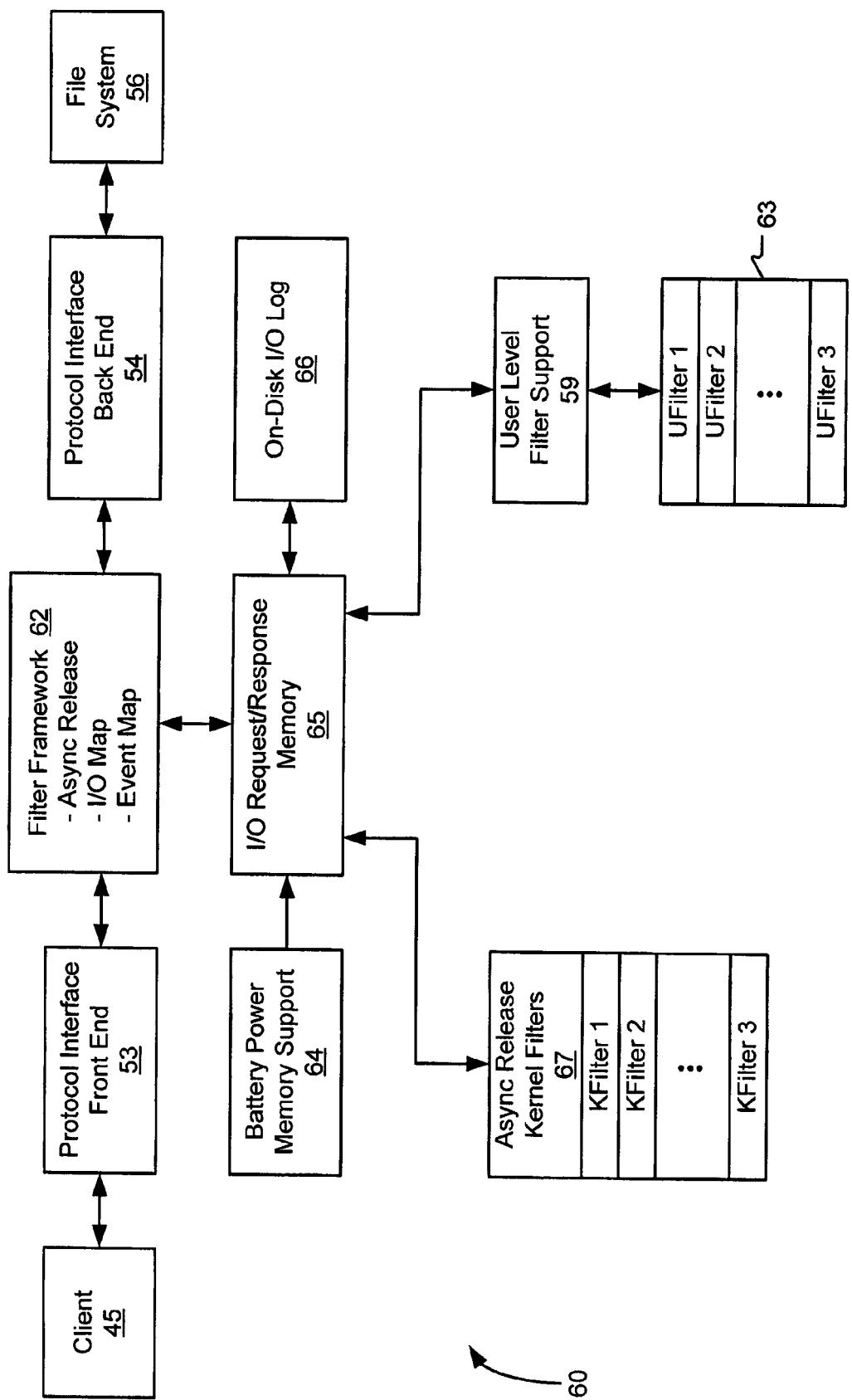
FIG. 6a is a block diagram illustrating an asynchronous release mode configuration for the filter framework in accordance with the present invention.

Referring now to FIG. 6a, a dataflow 60 for an asynchronous release mode embodiment of a filter framework for a filer is shown. The dataflow typically commences with a request from client 45, which is delivered to a protocol interface front end 53. Protocol interface front end 53 provides conversion from the I/O request format into a system internal request. Protocol interface front end 53 also provides conversion for responses from internal system responses to an I/O response in accordance with the chosen protocol. Typical protocols include NFS and CIFS, with the request and responses being provided between client 45 and protocol interface front end 53 typically through an Ethernet or Fiber Channel network. The converted internal system requests are delivered to filter framework 62 for filter processing.

Filter framework 62 enumerates filters 63, 67 to make a call to each one in a given order, depending upon the request. Filters 63, 67 can be cascaded, and some may be in kernel space, as indicated by kernel filters 67, while other filters, such as user level filters 63, may be in user space. User level filters 63 are supported by user level filter support 59. Filter framework 62 uses the asynchronous release call model, which permits filter calls in which the filter does not block incoming I/O or the calling thread. An address space in filter framework 62 provides a location for storing I/O information to contribute to permitting the filter to free I/O resources and threads. Filter framework 62 also receives responses from file system 56 in a return path. The responses prompt filter framework 62 to enumerate filters 63, 67 and invoke the appropriate filter response call back. Filter framework 62 ensures that I/O is properly ordered and in a form appropriate for requests and responses. Filters 63, 67 are also ordered, and include predefined tags to identify any I/O generated by filters 63, 67.

The address space in filter framework 62 includes an I/O map for use by filters that can operate in asynchronous release mode. The filters register for the type of I/O they desire, such as I/O for a synchronous call, or I/O for an asynchronous release call. The I/O map is used by filters to pass parameters in the asynchronous release mode to permit associated I/O and calling threads to be released.

Filter framework 62 also includes an event map that contributes to determining when and how a registered filter should be called. While the I/O map includes the registered callbacks for the registered filters, the event map provides information concerning when a particular callback is made. The event map is a data structure that holds identifiers for filters and filter characteristics, such as an indication of whether a filter is a remote filter. A filter call results from an evaluation of an expression that involves information taken from the I/O map and the event map. The determination of when and how to call a filter can be advantageous when filter calls generate significant amounts of control traffic in the filter framework, the file system or the network connections. For example, a user mode filter may register as a remote filter, which may be located at a different physical location from the filter framework. These types of remote user mode filters are discussed above with reference to FIGS. 5a, 5b. Because of the distance and the connection latency involved with calling a remote filter, a significant delay can be caused due to data traffic generated in calling the remote filter. Accordingly, it may be expeditious to avoid calling the remote filter with each and every pass through the filter call cascade. It may be more desirable to produce calls to such a filter based on conditioned events, as provided by the evaluated expression involving the I/O map and the event map in filter framework 62.

To avoid invoking a filter callback in undesirable circumstances, a combination of data taken from the I/O map and event map is used to produce a logical expression of when a filter should be called. The logical expression is evaluated in filter framework 62 to permit or defer a filter call. For example, a request from client 45 may include I/O information for which filter U Filter 1 in filters 63 has registered a call. Upon receiving the request, filter framework 62 consults the I/O map to determine that U filter 1 has requested a call based on the registered I/O information. Filter framework 62 then evaluates an appropriate logical expression as indicated by the registered call by U filter 1 and an entry in the event map for U filter 1 that describes how U filter 1 should be called. Based on the result of the expression evaluation, filter framework 62 will permit or defer the call to U filter 1. The I/O map includes the I/O callbacks available for the given registered filters. The event map provides criteria related to the filter registration to permit construction of a determination for invoking a filter call. The event map may include various parameters to contribute to building an expression that can be evaluated to determine when the filter callback should occur. Exemplary parameters include user credentials, client IP or source address, time/date information, a volume/directory/file designation for the I/O that is targeted, CPU/memory resources available at the time and update totals such as total desired updates for a given volume. Filter framework 62 evaluates the expressions composed of the event map parameters in combination with the I/O map to determine when a filter should be called. The conditioned calling of a specified filter helps to avoid message traffic congestion and improve overall filter operation.

An I/O request/response memory 65 is coupled to filter framework 62 to store request or response parameters. A number of request parameters may be saved in memory 65, such as file operation, filename and volume for the target of the operation, operation parameters, user credentials or time of request. Other parameters that may be saved in memory 65 include source information, such as an IP source address or a source host name. Parameters may also include protocol dependent information related file access protocols such as CIFS or NFS export. Block based protocol parameters such as luns may also be stored, for protocols such as iSCSI or Fiber Channel, for example. Examples of file operations include read, write and get attributes. Response parameters that are saved in memory 65 may include status and error codes, as well as data related to a read operation and attributes. If memory 65 becomes full, or fills to a given threshold, a flush to I/O log 66 occurs to free memory and retain I/O request/response parameter data. A flush is an operation to write data from one memory storage to another memory storage to preserve a state of the data, such as by saving changes to data held in a cache to a disk storage. Memory 65 may be battery backed by battery power memory support 64 to provide persistent parameter memory.

After a request callout to a filter, filter framework 62 need not wait for a filter return to continue processing. If status permits, the current request is forwarded to protocol interface backend 54 and on to file system 56. Responses from protocol interface backend 54 delivered to filter framework 62 are used to call up filter response processing in the same way as filter request processing. Again, filter framework 62 need not wait for a filter return from a filter response handler to continue processing.

Kernel filters 67 are invoked by filter framework 62 using memory 65. The filter invocation involves request and response callouts using a communication structure in memory 65 that is specific to kernel filter callout. An example of the protocol with the communication structure is SpinNP discussed above. Kernel filters 67 register with filter framework 62 for I/O requests and responses in asynchronous release mode. The parameters for the I/O components of the request and response are similar to those parameters for user level filters described above.

User level filter support 59 also receives request/response parameters from memory 65, enumerates user level filters 63 and invokes user level filter callouts. User level filters 63 register with user level filter support 59 to obtain request and response callbacks related to the filter operations. User level filters 63 may be locally or remotely located, as discussed above with respect to FIGS. 5*a*, 5*b*. The request parameters may include such components as file operation, file name and volume for the operation target, file operation parameters, user credentials and time. The request parameters may also include information related to the origin source, such as a source IP address or a source host name. The request parameters may also include CIFS export or NFS export file based requests. Alternately, or in addition, the request parameters may include block based requests, such as those based on iSCSI or Fiber Channel.

In general, any available parameters desired for filter operation may be registered with user level filter support 59. The response to user level filter support 59 may include parameters such as return status and error codes, data from file system 56 in the case of a read operation, and attributes related to the data or the response. The return status provided to user level filter support 59 does not matter in asynchronous release mode, since filter framework 62 need not wait for a filter return to continue processing.

Filter framework 52 can forward a current request to protocol interface back end 54, depending upon whether permitted by the status returned to filter framework 52. Protocol interface back end 54 provides responses to filter framework 52, which can initiate the response callback processing, similar to the request callback processing described above. Protocol interface back end also routes current requests and responses to and from file system 56. File system 56 processes incoming requests, applies them to the data storage system and receives a response, which is forwarded to protocol interface backend 54. This sequence provides the initial steps in a response flow path that ultimately provides a response to client 45.

Figure 6B:
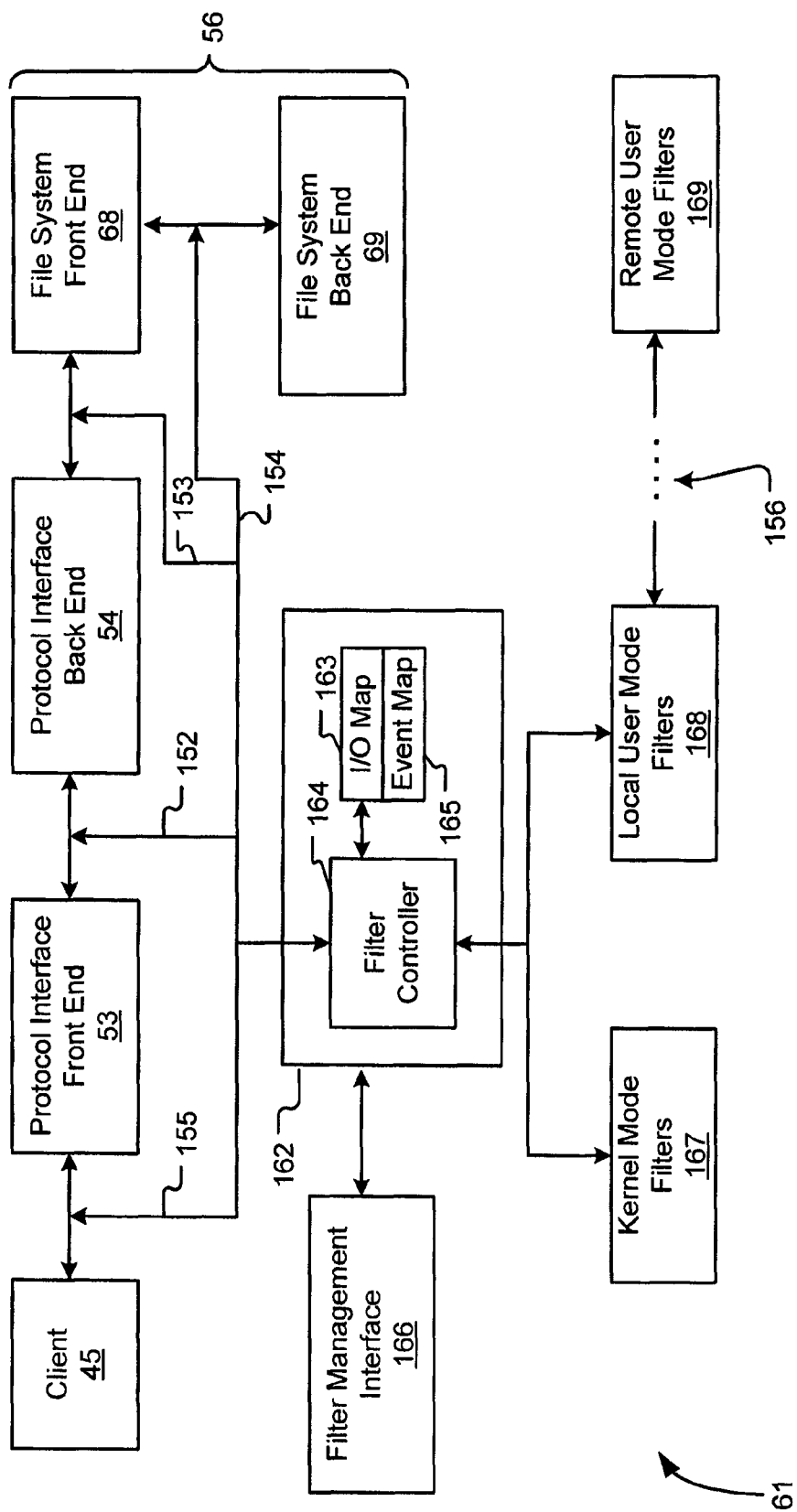
FIG. 6b is a block diagram illustrating points in a filer system at which a filter framework may be operatively coupled.

Referring now to FIG. 6*b*, a filter framework 162 is illustrated as being "hooked into" or coupled to the filer system, represented as a filer 61, in one or more of a variety of locations. In this exemplary embodiment, filter framework 162 is implemented as a single binary executable application that is coupled to the filer 61 at points 152-155. A single binary executable application is a standalone instruction code that can be compiled as a separate module, for example. Filer 61 is represented as having a file system front end 68 and a file system back end 69. File system front end 68 corresponds to a file system layout structure, such as WAFL, for example, as well as a messaging interface suitable for high performance messaging with such protocols as SpinNP, as discussed above. File system back end 69 corresponds to a hardware oriented interface, for such systems as may provide functions for flushing, RAID and volume management.

Point 152 represents filter framework 162 coupled to filer 61 between protocol interface front end 53 and protocol interface back end 54. Point 153 represents filter framework 162 coupled to filer 61 between protocol interface backend 54 and a file system front end 68. Point 154 represents filter framework 162 coupled to filer 61 between file system front end 68 and file system back end 69. Point 155 represents filter framework 162 coupled to filer 61 between a client 45 and protocol front end 53. Point 155 can be a network interface that receives/sends requests/responses based on a number of protocols, including file and block oriented protocols. A filter controller 164 provides a construct for coupling filter framework 162 to filer 61. The coupling points or "hooks" 152, 153 and 154 may be provided through interaction with messaging mechanisms that exist between protocol interface front end 53, protocol interface backend 54, file system front end 68 and file system back end 69. Each point 152, 153 and 154 has a separate queue within filter framework 162 on a per-volume basis. Accordingly, queues for points 152, 153 and 154 may be maintained within filter framework 162 for each volume established within file system 56. The queues represent organized call structures for calling filters that are to be activated at the specified points 152, 153 or 154. Because different information may be available depending on where a filter is hooked to points 152, 153 or 154, a request from client 45 and response from file system 56 can be captured along the data path where pertinent information is available in relation to specific filter operation. For example, a filter hooked to point 152 can obtain protocol related information from protocol interface front end 53 to permit filter operations in relation to protocol information, such as IP or network external addresses. Similarly, points 152, 153 or 154 permit filter operations on a block access basis, rather than a file access basis alone.

A filter may be hooked into one or more points 152, 153 or 154 depending upon entries in the respective queues for calling the specified filter. A filter management interface 166 indicates to filter framework 162 where a filter should be hooked into filer 61. Filter management interface 166 can indicate to filter framework 162 that a filter should be added to or removed from a queue for one or more of hooking points 152, 153 or 154. Filter framework 162 provides an Application Programming Interface (API) to abstract the private details of hooking points 152, 153 and 154. Filter management interface 166 uses the API to indicate where an inserted filter should be hooked. The operational mode of the filter and registration information for filter calls. The registration information may include request/response parameter extractions used in filter operations and full path name extractions, which can be file or block oriented. The filter operation mode can be asynchronous or asynchronous release, depending upon a selection of hooking points 152, 153 or 154. Also depending upon filter operation mode, one filter can be inserted into multiple hooking points to operate simultaneously at those hooking points.

The hook points for filter framework 162 to be coupled to filer 61 need not be active if a given queue or queues for one or more of hooking points 152, 153 or 154 is empty. That is, if there is no filter call in a given queue, no change occurs in the operation of filer 61 relative to the associated hooking point. When filter management interface 166 notifies filter controller 164 that a filter should be inserted into a given hooking point, filter controller 164 puts a call for the specified filter into the specified queue for the associated hooking point 152, 153 or 154. Filter controller 164 then enables a data path intercept for the associated hooking point 152, 153 or 154.

The organization of filter framework 162 with multiple hooking points permits a filter that is single-source based, meaning it is compiled as a self-contained module, independent of desired hooking points. The configuration of filter framework 162 permits the filter to be inserted at selectable hooking points, without reconfiguring the filter code, or recompiling the filter module. Placement of a given filter into a queue for an associated desired hooking point can take place after loading of the filter, or as part of the loading procedure.

Kernel mode filters 167 can take advantage of filter framework 162 being coupled to filer 61 at points 152-155 to interact with particular filer components. Points 152-155 at which filter framework 162 is coupled to filer 61 permit kernel mode filter interaction with components of filer 61. The hooking locations include points within or before a protocol server, between the protocol server and a messaging interface for communicating with data storage devices or located between the messaging interface and the data storage devices. As discussed above, kernel mode filters 167 can be single source based, and compiled once, but placed into filer 61 at different points 152-155 of interaction. The security filter of the present invention is a kernel mode filter due to the sensitive nature of data being processed. User mode filter applications can be of two types, local user mode filters 168 and remote user mode filters 169. Local and remote user mode filters 168, 169 may similarly interact with filer 61 at hooking points 152-155. Local and remote user mode filters 168, 169 operate through a user level filter support, which interacts with a kernel level filter support to make system calls or provide system oriented operations for local and remote user mode filters 168, 169. Remote user mode filters 169 may be located at a physically remote site, or on a separate filer system that may be connected to filer 61 through a network connection, such as through cluster switching fabric 160 or connection system 180, illustrated in FIG. 1. In FIG. 6b, remote user mode filters 169 are illustrated as being available at a same level as local user mode filters 168 through a connection 156, since remote user mode filters 169 interact with filter controller 164 and filter framework 162 similarly to local user mode filters 168. Because remote user mode filters 169 are registered with filter framework 162 as remote filters, an I/O map 163 and an event map 165 may be used to provide a determination of when remote user mode filters 169 are actually called, as discussed above with respect to filter framework 62 in FIG. 6a.

In addition to having a selectable insertion point 152-155 for a filter to be coupled to filer 61, each filter 167-169 may be compiled with a flag to indicate a desired hooking point 152-155. This compile time feature avoids user or administrative interaction through filter management interface 166 to indicate to filter framework 162 where the given filter should be hooked. Filter controller 164 calls filters 167-169 in a given order, which can depend upon priority, or location within a queue, for example. Because filter priority can vary among the filters in the different queues, a filter call to the next filter in a queue may be delayed while higher priority filters in other queues are called and permitted to complete processing. Accordingly, filter call order depends upon several factors including priority and queue order. Calls to a given one of filters 167-169 can be triggered by other filters, or can be based on calls or callbacks from filter controller 162 as indicated by the specific I/O activities for which the specified filter registers. Filters 167-169 are typically associated with a particular volume or snapshots for a particular volume.

Figure 7:
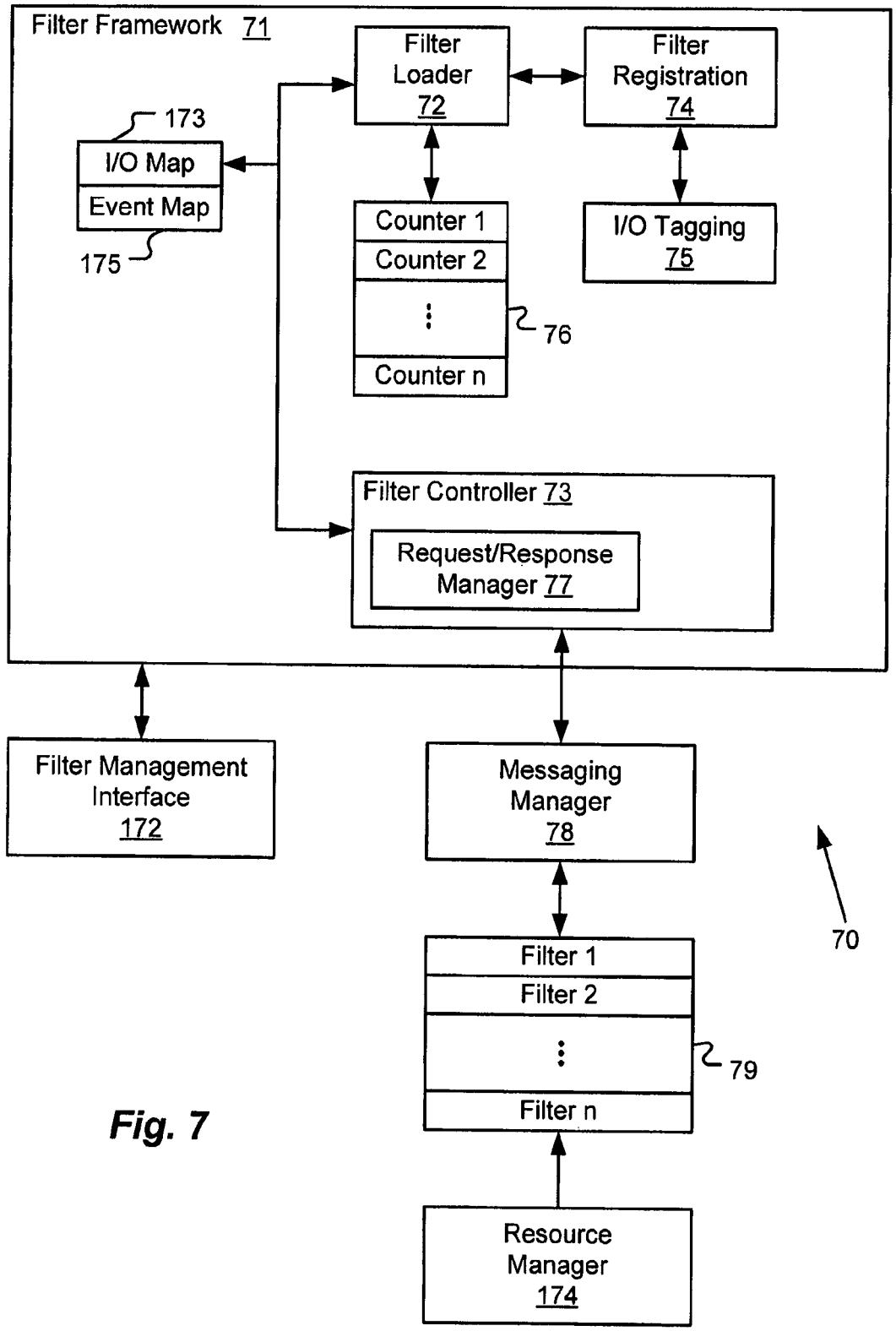
FIG. 7 is a block diagram illustrating a filter framework embodiment in accordance with the present invention.

Referring now to FIG. 7, a configuration 70 for a filter framework 71 is illustrated. Filter framework 71 includes a filter loader 72, a filter controller 73, a filter registration 74, an I/O tagging 75 and I/O and event maps 173, 175. Filter loader 72 includes a number of counters 76, one for each registered filter. Filter controller 73 includes a request/response manager 77 that contributes to handling request and response callbacks. Filter controller 73 communicates with filters 79 through a messaging manager 78. Messaging manager 78 provides high performance messaging between filter controller 73 and filters 79, and may be realized through one or more communication formats such as shared memory, input/output control (IOCTL) or IPC socket connection, for example. These communication formats provide a structure for the transfer of parameters from filter controller 73 to filters 79, as well as for the return of status to filter controller 73.

Upon callout, filters 79 may take advantage of a resource manager 174. Resource manager 174 is made available for handling a variety of filter functions at both a user level and a kernel level. Exemplary features included in resource manager 174 are management components for managing threads, memory, resource locking, file I/O, volumes/snapshots, sessions, names and messaging.

Filter controller 73 includes a watchdog timer (not shown). The watchdog timer is a mechanism for determining if filters 79 are responding properly. The watchdog timer is started or reset when filter controller 73 calls a filter, and times out if the filter does not properly respond within the time frame defined by the watchdog timer time interval. If the watchdog timer times out, the filter is considered unresponsive and is skipped for further calls in the filter order. The watchdog timer can be implemented as a timer interval or as a counter with a given value that counts at a given rate.

Filter loader 72 registers a filter with filter controller 73 through filter registration 74 and identifies resources to be used for filter operations. Filter framework 71 can freeze I/O during loading and unloading or starting and stopping a given filter. For example, filter framework 71 can maintain a buffer (not shown) to permit filter related I/O to be halted and stored while the filter changes state, such as from "loaded" to "started." In accordance with an exemplary embodiment according to the present invention, a security filter can be automatically upgraded using the starting, stopping, loading and unloading functions provided by filter framework 71 and filter loader 72. A prior version of a security filter is stopped to avoid generating additional I/O requests. Any pending I/O requests are buffered in filter framework 71. After receiving a confirmation that the prior version security filter is stopped, filter loader 72 unloads the prior version security filter, and loads an updated version security filter. Once filter loader 72 confirms that the updated version security filter is properly loaded, filter framework 71 starts the updated version security filter. Once filter framework 71 confirms that the updated version security filter is started, the I/O requests are permitted to continue. The continued I/O requests may be derived from the buffer provided by filter framework 71.

Filter loader 72 provides a counter 76 for each filter 79 to permit tracking of I/O operations in the event of a filter unload. Filter framework 71 tracks and completes filter I/O prior to unloading the specified filter. A counter 76 maintained for each filter 79 counts I/O events, and counts down to zero to indicate all I/O processing has been completed, and that the filter is ready for unloading. Filter loader 72 also identifies I/O associated with registered filters through I/O tagging 75, so that filter I/O requests and responses can be identified to avoid conflicts.

Filter framework 71 also includes an I/O map 173 and an event map 175 that operate together to determine when and how a registered filter should be called. I/O map 173 includes information related to callbacks for registered filters based on I/O events. Event map 175 provides criteria for determining when a filter should be called. Even map 175 is aware of the characteristics of registered filters, which contribute to formulating a logical expression that can be evaluated to determine when a filter should be called. The expression can include elements from I/O map 173, so that calls to registered filters can be made or deferred based on how requested I/O events are processed. For example, a user mode filter may register as a remote filter in filter registration 74. The remote filter may be located at a different physical location from filter framework 71. To avoid data traffic tie-ups or processing latency that is typical of remote processing, calls to the remote filter may be deferred until a given set of I/O events are ready for processing or until other conditions are met, as defined by the expression evaluation determined by I/O map 173 and event map 175.

Filter framework 71 is also coupled to a filter management interface 172 for user access to filter framework 71. Interface 172 may include an API for users to manage filter functions, such as loading or unloading filters using filter loader 72.

Figure 8:
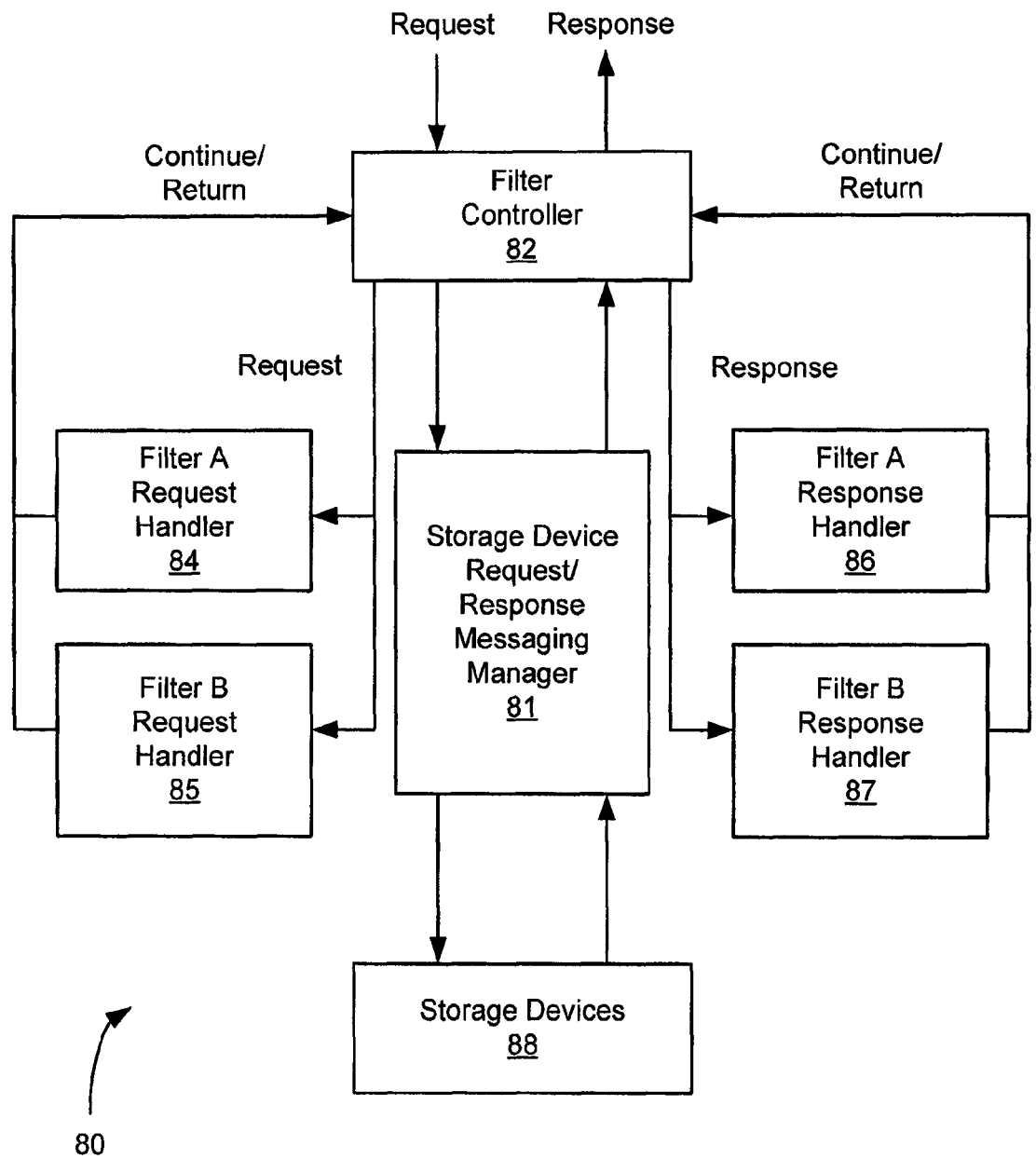
FIG. 8 is a block diagram illustrating request/response operations with a filter controller and filter handlers.

Referring now to FIG. 8, a request/response dataflow 80 is illustrated. Filter controller 82 intercepts requests to a file system and storage devices 88 and makes filter calls to filter request handlers 84, 85. Request handlers 84, 85 begin processing filter functions upon receipt of a request. Request handlers 84, 85 also provide a status to filter controller 82 that indicates how filter controller 82 should continue processing. For example, the status may include an error code indicating that a filter operation did not complete successfully. Filters A and B can be user or kernel mode filters.

Filter controller 82 forwards requests to messaging manager 81, which is a high performance messaging protocol system for requests and responses of storage devices 88. Responses from storage devices 88 are returned to filter controller 82 through messaging manager 81. Once filter controller 82 receives a response, response handlers 86, 87 may be invoked to process the response. Response handlers 86, 87 provide status information to filter controller 82 related to the response processing to indicate how filter controller 82 should proceed with processing.

In accordance with the present invention, an exemplary security filter provides access security and data security in conjunction with the above-described filter framework. The security filter operates based on detecting unauthorized or suspicious events within the filer, and installing traps to capture responses normally provided to a user. A trap is an event oriented redirection of process flow organized by the security filter to capture and redirect a file system event. For example, an "access denied" error produced by a disk storage device can be captured by a trap installed by the security filter, which redirects process flow to respond to the error. An access denied error is a response provided by a file system indicating a lack of permissive access to a given directory, file or block, for example. The directories, files and blocks have associated permissions, related to access and manipulation of the directory, file or block of the file system. If a user attempts to access a file, directory or block for which the user does not have permissive access rights or data manipulation permission, an access denied error is returned to the user. A trap manager indicates when traps should be installed to capture specific responses from the file system. The installed trap captures specific responses from the file system or storage devices, and redirects process flow to effectively block the response for reaching the client or user that posed the request that resulted in the captured response. In addition, the security filter can capture requests that are from an identified intruder, or a client/user that is identified as attempting to obtain unauthorized access to the file system. With the specific response captured, the security filter can respond with a variety of substitute results that do not include the specific response. For example, the security filter can generate artificial data in response to being triggered, which data may include artificial files or directories. A data generator provides artificial data that may be arranged as a simple pattern, or derived from actual data to represent a file content. The generated data can be customized depending upon various criteria including information related to the request, information related to the specific response, or the event causing the trap action. The security filter can also identify an intruder with an indication that can be used to implement actions particular to the user marked as an intruder. For example, once a user/client is marked as an intruder, any further request from the intruder is marked as an intruder request and handled directly by the security filter to return a response without interacting with the file system. Alternately, or in addition, a response from the file system produced by the client/user request can be marked as an intruder response and captured and handled by the security filter directly.

According to an exemplary feature of the present invention, the security filter registers with the filter framework in the synchronous mode. Various security filter embodiments may be constructed that take advantage of the asynchronous or the asynchronous release modes, which modes may be implemented to avoid blocking I/O data paths or calling threads. In addition, the security filter can track and log an event history of an intruder that may be used for further analysis. The security filter can also initiate an alarm depending upon the type of trap and implemented policies for handling detected intrusions.

Figure 9:
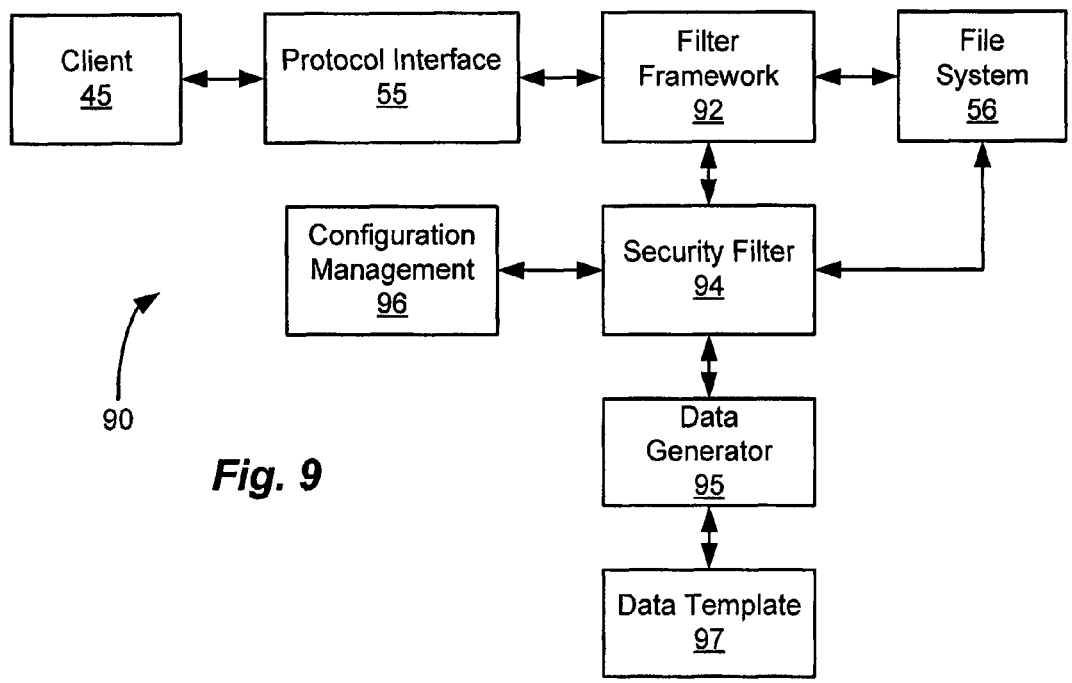
FIG. 9 is a block diagram illustrating a security filter in a filer.

Referring to FIG. 9, an exemplary filter system 90 that includes a filter framework 92 provides security for file system access and file system data. A client 45 provides a request for data from file system 56 using typical access protocols, such as NFS or CIFS. The request is forwarded through protocol interface 55 to filter framework 92. Filter framework 92 can be similar to filter framework 52 depicted in FIGS. 5a, 5b and operates as described above to provide a filter call mechanism for registered filters. Client 45, protocol interface 55 and file system 56 are the same as those depicted and described with reference to FIG. 5b, with protocol interface 55 being located between client and filter framework 93 rather than between filter framework 52 and file system 56.

A security filter 94 provides security filtering based on detecting unauthorized intruder requests and trapping corresponding file system responses. Filter framework 92 invokes security filter 94 through a particular request/response data structure for each I/O. For example, the request/response data structure may be formed based on an open system call, or based on messaging protocols such as spinNP discussed above. When security filter 94 registers with filter framework 92, a number of request types initiated by client 45 are selected for registration by security filter 94. Exemplary requests for which security filter 94 registers includes file open, file create, file lookup, file read, get attributes, directory read and directory write. These types of requests are those typically involved in intruder activities and undergo greater scrutiny. Upon receiving any of these types of requests, filter framework 92 invokes security filter 94 with the particular request/response data structure appropriate to the call out for security filter 94. When filter framework 92 invokes security filter 94, the call may be a simple function call or the passing of a message, which can include passing a pointer to security filter 94 that points to the data structure.

According to one exemplary embodiment, upon invocation, security filter 94 can generate a request to file system 56 based on the type of access requests provided from client 45. For example, security filter 94 may provide a read, open or write request for a file or directory. File system 56 processes the incoming request and returns a response to security filter 94. File system 56 may return a response indicating denied access for the particular request, which may be on the basis of access permissions assigned to files, directories, categories or users, for example. In another exemplary embodiment, security filter 94 examines and reacts to the request or response and does not access file system 56, but processes the request or response itself directly. In any case, security filter 94 processes requests and responses and provides a status to filter framework 94 indicating how further processing should proceed, such as by returning a status of "continue" to permit other filters to be called.

When security filter 94 receives a denied access response to a request submitted to file system 56, the response is logged as an event that potentially triggers a security event. For example, a number of suspect responses may cumulatively indicate a security event. In addition, when a security event is indicated, security filter 94 can track and log an event history of the so identified intruder with an event log 109 that may be used for further analysis of intruder activities.

If a security event is triggered within security filter 94, a number of responses are available. Security filter 94 may return a specific pattern of data for use as directory names, directory contents, file names or file contents. Security filter 94 may also examine information about the request or response to derive a theme for the information, and produce a response with generated information related to the derived theme. Security filter 94 may also produce a predefined set of information based on file name, file contents or other aspects of the request or response. Each of the above types of responses are described in greater detail below.

Security filter 94 may also cause client 45 to be marked as an intruder, which assigns a particular status to requests and events associated with client 45. Security filter 94 may respond by generating artificial data that may be dependent upon the type of request and response, such as an access denial response, provided by file system 56. For example, security filter 94 may communicate with a data generator 95 to obtain a specific pattern of data that can be used to generate directory names, directory content, file names or file content. For example, the specific pattern can be inserted into a file stub that is eventually provided to client 45. A file stub is an initial file structure that can be filled in with content to form a typical file in file system 56. Security filter 94 can create directories or directory trees with artificial entries from the specific patterns as well. An example of a specific pattern is "abcd," which may be used as a directory name, file name or file content in a response returned to client 45. In addition, security filter 94 may derive context or metadata information from the request and/or response from file system 56. Context information refers to information known to a particular object, such as a filter, that the object can use or produce as a result of object processing. For example, CIFS and NFS file protocol based requests include a client source address, which can provide a context for processing the request or response, such as identifying a particular client. Metadata information refers to information about inodes, directories, files and blocks for a given volume or snapshot. Block checksums and physical location data are examples of metadata. Security filter 94 uses the derived data to invoke data generator 95 to generate contextual or thematic data for a response to client 45 marked as an intruder. Data generator 95 may query data templates 97 to obtain support for generating thematic data to form an artificial response that is passed by security filter 94 to client 45, where client 45 is marked as an intruder. Furthermore, security filter 94 can provide a response to client 45 that includes a predefined set of information in relation to information about the request or response. An example of a predefined set of information is a document, such as a trade journal article, that is provided to client 45 in response to a request submitted to file system 56 that includes a content that is related to the predefined data. For example, if the request is based on a file name or a file content that is related or includes the term "finance," security filter 94 provides a response to client 45 that includes a document that is an article related to financial matters.

Filter system 90 operates by examining requests from client 45 and responses from file system 56, as directed to security filter 94 by filter framework 92, to determine if client 45 is attempting to obtain unauthorized access to information in file system 56. Various conditions related to the requests or responses lead to determining when client is considered an intruder. For example, if client 45 sends requests for information from file system 56 that result in access denial errors a certain number of times, such as three (3) times, for example, then client 45 is considered an intruder. A number of other definitions for an intruder may be used to determine when client 45 is considered an intruder, as discussed in greater detail below. When client 45 is designated an intruder, by producing a third access denial error from file system 56, for example, security filter 94 receives the access denial error from file system 56, as intercepted and provided by filter framework 92 through a filter call. Security filter is registered with filter framework 92 to be called in the event an access denial error is provided by file system 56. Security filter 94 then causes a trap to be installed to capture further requests or responses related to client 45, and uses the trap to identify the captured requests or responses as intruder requests or responses. Security filter 94 blocks the third access denial error from reaching client 45, and substitutes another response that may include patterned data, generated data or predefined data, depending upon how security filter 94 is configured for response based on the type of intruder detection or theme of the unauthorized access attempts, for examples.

If security filter 94 is configured to provide a specific pattern of data, then data generator 95 generates patterned data such as "abcd" as file system content related to the request or response indicated as being from an intruder. The patterned data may be used as a directory name, a file name or a file content, depending upon the nature of the request and the response. If the patterned data is to be used as a directory or as file names in a directory, security filter 94 creates a name space in which the directory or directory content developed with the patterned data is stored. In this configuration, if client 45 attempts to access a directory for which it does not have permission, resulting in client 45 being marked as an intruder, the access denial error from file system 56 is captured by security filter 94 and data generator 95 produces a number of artificial file names using patterned data. The file names are returned to client 45 as substitute, artificial information, which client 45 may expect in response to its request. For example, data generator 95 may produce a list of files with names having a simple pattern such as "data1.txt, data2.txt, . . ., data20.txt," which listing is stored in a name space accessible by security filter 94. The files are given realistic attributes, such as dates and sizes that would not be considered unusual. For example, the file with the name "data1.txt" may be filled with a text pattern of "abcd" to give it an appropriate size, as might be expected by an intruder, rather than a much smaller size as might occur if the file "data1.txt" was an empty file.

If security filter 94 is configured to provide generated data in response to an identified intruder request, security filter 94 derives information about the request or response to determine a theme of the request or response and respond with generated information related to the derived theme. Some examples of sources used to derive a theme for the request or response include a target volume, directory or file name or attributes, an owner of a requested file and a volume or directory where a target file is located. The generated information can be developed according to several different methods. In one method according to an exemplary embodiment, data generator 95 produces a mapping of artificial data to actual data, so that a request for actual data results in a response that includes the artificial data indicated by the mapping. The artificial data is developed based on the theme derived from the request or response, in conjunction with data supplied by data templates 97. Data templates 97 include various categories of information as may be useful in producing artificial data related to a given theme. For example, if client 45 attempts to access an unauthorized directory, and is identified as an intruder after an access denial error from file system 56, security filter 94 examines the request and directory to derive a theme. If the derived theme is "payroll," for example, security filter 94 examines the actual directory on file system 56 indicated by the unauthorized request by client 45. If the actual directory includes ten files, for example, security filter 94 sets up a mapping to ten artificial files in a name space accessible by security filter 94. Further attempts by the identified intruder to access the directory or actual files results in a response to the intruder that includes the artificial files indicated by the mapping. The artificial files are provided with names from data templates 97 that are drawn from a category associated with the derived theme of "payroll." For example, data templates 97 have categories for themes of finance, human resources and payroll. If client 45 was attempting to obtain unauthorized access to a directory related to the theme of "payroll," and the theme can be derived from information in the request or response, then artificial file names are drawn from data templates 97 from the category most resembling a theme of "payroll." The artificial file names drawn from the payroll category of data templates 97 may have names such as "employee1pay.doc," "monthlypayroll.doc" or "yearly-compensation.doc," for examples. The listing of the 10 artificial file names thus generated by data generator 95 are returned to client 45. In this way, client 45 is unaware that the request did not result in an access denied error from file system 56, and instead may be led to believe that they have obtained access to the requested, unauthorized data. The misinformation provided according to this technique can help to maintain the attention of the intruder, while intruder events are being logged and tracked, which can assist in identifying the individual attempting to obtain unauthorized access.

According to a method of another exemplary embodiment, the generated information is developed through random generation of data by data generator 95. Instead of the mapping to emulate the actual state of the requested information in file system 56, data generator 95 can create a name space with randomly generated names and attributes for directories and files. Again, data templates 97 provide information related to a category selected by proximity to the derived theme of the request or response. As an example, data templates 97 can have a text file in a "finance" category that includes a number of finance related terms. The terms are used to populate a name space with directory and file names based on random selection when the derived theme related to finance. This type of artificial data generation can be done "on the fly" to be responsive to specific intruder requests.

In either of the above methods for generating artificial data, security filter 94 provides client 45 with a response that emulates a content of file system 56 intended to meet some expectation of client 45. If security filter 94 provides an artificial directory listing of files to the intruder, and the intruder attempts to access one of the files, the request is directed to security filter 94, which intercepts the request and prevents the request from being forwarded to file system 56. Security filter 94 then provides an artificial content of the file selected in the request from the intruder according to any of the techniques described herein. Accordingly, after client 45 is identified as an intruder, further requests from client 45 are interpreted by security filter 94 and are prevented from reaching file system 56. Security filter 94 operates on the request to generate a response directly, which response is returned to client 45 marked as an intruder.

If security filter 94 is configured to provide predefined data, in response to an intruder request, security filter 94 again derives information about the request or response to determine a theme for predefined data to be returned to the intruder. Once the request from client 45 triggers a security event definition to cause security filter 94 to mark client 45 as an intruder, security filter 94 examines the request and/or response to derive a theme. Various data mining or content analysis techniques may be used to develop the theme from the request or response related information. The security event definition that causes client 45 to be marked as an intruder can be set by an administrator, and can be based on a number of criteria. For example, client 45 may have attempted to access an unauthorized directory related to human resources three times, upon which security filter 94 traps a third access denied response from file system 56 in accordance with the corresponding security event definition. The request and/or response is analyzed to derive a theme of "human resources." The derived theme is provided to data generator 95 to obtain predefined information for a response to client 45 now marked as an intruder. Data generator 95 may have predefined data, such as random trade journal articles that are returned in response to client 45 regardless of the derived theme, depending upon the configuration of data generator 95 and security filter 94. Alternately, or in addition, data generator 95 may request predefined data from data templates 97 drawn from the category of "human resources," or a category in data templates 97 that most resembles the theme. The predefined data can be a directory listing, file name or file content that are provided to data generator 95 and security filter for response to the intruder. If the intruder was attempting to open a restricted file in a human resources related directory, security filter 94 returns a file with a name and content provided by data generator 95 and data template 97 to emulate a response that the intruder might have expected.

The configuration of the content of responses with artificial data, and how the artificial data is developed is provided by configuration management 96. Configuration management 96 is an administrative interface for specifying how security filter 94 operates, such as whether artificial data is provided as patterned data, generated data, or predefined data. Configuration management 96 also permits specification of the method in which generated data can be provided. A number of other administrative and management functions for security filter 94 are also provided through configuration management 96, such as where in filter system 90 security filter 94 is hooked, the type of I/O for which security filter 94 registers and management of security event definitions.

Data templates 97 facilitate the generation of artificial data, and can store various types of artificial data to quickly provide a realistic response to an intruder. Data templates 97 may include a readily accessible predefined set of information, which can be modified to include information relevant to the intruder request. For example, data template 97 can produce a predefined set of text paragraphs that include a financial topic when data generator 95 determines that the request or response includes such subject matter. The test paragraphs can include placemarkers for insertion of information related to the intruder request or response, such as file name or file content, for example. In addition, or alternately, data templates 97 may return predefined information directly in response to a request, such as artificial file names, file content or other predefined information. The predefined information can be selected from a number of available choices, based on a theme derived for the request or response, for example. The predefined information can also be useful to help identify intruders in response to intruder requests. That is, if a content of a request indicates that the predefined information was previously provided to the requester, the requester can be identified as an intruder.

Data templates 97 thus consist of a collection of various forms of data with groupings related to predetermined themes. The data forms can be documents related to a given theme, text files containing lists of related terms or blocks of text that may include terms, numbers or other related symbols. The grouping, or category setup, is used by a lookup mechanism or search engine (not shown) to obtain information related to the theme derived from the request or response information. For example, if a suspicious request includes a particular key word, such as "finance" or "payroll," the key word can provide the derived theme that is applied to data templates 97 to obtain artificial data. The key word is used to conduct a search or lookup of categories from which artificial information may be drawn. A number of categories of information are maintained in data templates 97, so that a search can determine the information in data templates 97 that has the closest theme to that of the content of the suspicious request or response. Previously prepared documents may be provided for each category defined in data templates 97, for example. Data templates 97 can also return data patterns based on the chosen category determined by the key words. Data templates 97 can also generate data patterns referenced to a particular file name, a time or file content, for example. Data templates 97 may also provide benign or neutral information in relation to the theme derived for the request or response. For example, if the request or response relates to confidential information, some publicly available or non-confidential data related to the request or response may be provided instead as the benign or neutral information. Once the determination of a category is made, various criteria may be used to determine the closest match of the previously created documents to the theme. The criteria may include, for example, a file name, a file content, a directory listing, an owner of a file, a directory and volume where the file is located, context or metadata information, as well as other criteria that tends to indicate the intent of the intruder request.

Figure 10:
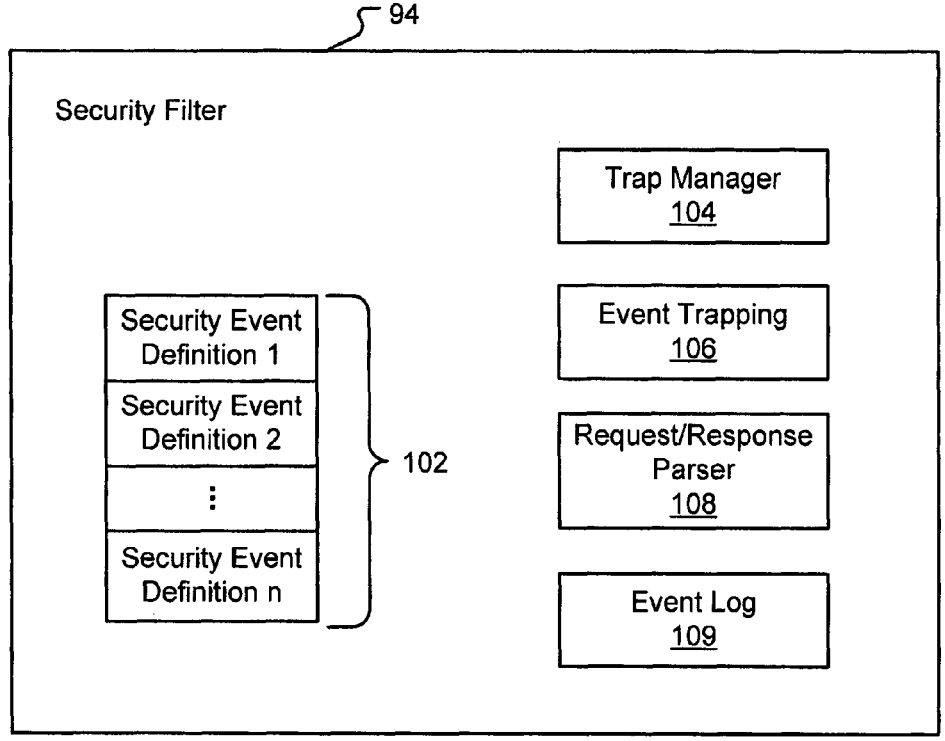
FIG. 10 is a block diagram illustrating security filter components.

Referring now to FIG. 10, a simplified diagram of security filter 94 is illustrated. Security filter 94 includes a number of definitions of security events, indicated as definitions 102. Definitions 102 include various sequences or events that tend to indicate attempts by an intruder to bypass system security. For example, security event definition 1 may be defined as a number of repeated failed file open attempts from a guest client work station. The number of attempts may be defined to be static or dynamic, depending upon context and environmental factors, such as time of day, for example. In one embodiment, three repeated file open failures from a guest work station (not shown) causes security event definition 1 to indicate the detection of a security event. A guest workstation is a computer workstation accessed by client 45 under a guest login. A guest login typically refers to a login that permits limited access to a network and network components to which the computer workstation is attached. Security event definition 2 may provide another example of a security event, such as sequential traversal of files in the file system with occasional read errors. When security event definition 2 identifies such an instance of operations on the file system, a security event is indicated as being detected.

Security events have attributes that contribute to producing the security event definitions. For example, the security event definitions may include attributes of time, user IDs or group IDs, a source address for the request, a process ID or process name, or certain types of I/O combinations. The security event definitions 102 can be viewed as expressions that are evaluated to implement security event detection.

Upon detection of a security event, security filter 94 continues processing the request by forwarding the request to file system 56, where traditional access permissions are applied. The response from file system 56 returns an access denied error in response to commands such as file read, file open, file write, get attributes, directory read or directory write. In the absence of security filter 94, the access denied error responses are returned to client 45, which, as an intruder, would then be better informed about the access permissions of file system 56. The presence of security filter 94 permits an access denied error response to be trapped, and an artificial response to be generated to the intruder, so that the intruder does not receive information related to the configuration of access permissions of file system 56.

The determination of when to trap a response derived from a given request is provided by a trap manager 104 in security filter 94. Trap manager 104 is a module that directs traps to be installed based on detection of a security event through security event definitions 102. Trap manager 104 determines an implementation of a response to an intruder request, as defined by definitions 102 and/or indicated by the intruder status of the request. If one of the security event definitions 102 indicates that a request is from an intruder, trap manager 104 invokes event trapping 106 to initiate trapping of the response generated by the request. When security event definitions 102 do not collectively indicate any security events, security filter returns an appropriate status to filter framework 92. Any access denied errors generated by file system 56 are then returned directly to client 45.

When trap manager 104 determines the detection of a security event, and invokes event trapping 106, the trap installed by event trapping 106 can trap any type of response from file system 56. For example, traps can be installed to capture errors, directory, file or block metadata or content information provided by file system 56.

Various responses may be undertaken by security filter 94, depending upon the intruder request and the trapped response from file system 56. For example, event trapping 106 may trap a response to a file open request, so that when an intruder fails to open a file, the associated access denied error triggers the installed trap to execute code that produces a substitute response in place of the access denied error. The code executed by the installed trap upon being triggered causes an artificial file open to be generated and supplied to client 45 as an intruder. The code itself is provided by event trapping 106, although the code may be drawn from other known modules, such as a module that generates a file open response in general for use in this example. The artificial file open instance is marked with an indication such as "intruder open." Similarly, if client 45 uses an "intruder open" instance to open and read a file, or obtain read access, the event is trapped by event trapping 106, which can then generate a request to data generator 95 to obtain artificial file data for read access. If a client 45 attempts to issue a write command from an "intruder open" instance, the response to the request is again trapped by event trapping 106, and the write request is directed to a temporary address space that is marked as an intruder space. Subsequent read requests directed to the temporary space based on the "intruder open" instance also cause the associated responses to be trapped and the artificially written data is returned to the intruder.

The "intruder open" instance may also provide requests related to reading directories, which produces a trap of the response from file system 56. The directory read request also produces a request to data generator 95 to produce artificial directory entries or trees, each of which is marked as "intruder open." Accordingly, requests for access to the directories marked with an intruder indication, such as open, read or write access requests, cause an event trap in event trapping 106 to permit security filter 94 to respond to the intruder with artificial data.

Security filter 94 includes a request/response parser 108, which is a module that inspects a content of a request or response to derive contextual or metadata related information. The contextual or metadata related information is passed to data generator 95, which can then produce artificial information that is contextual or thematic in relation to a request marked as being from an intruder, or in relation to a response trapped by security filter 94. Data generator 95 can generate benign or neutral information related to the context or theme developed through parser 108. For example, if a request from a client marked as an intruder includes the term "payroll," parser 108 provides an indication to data generator 95 to develop related artificial information, such as artificial names and numbers emulating payroll information. Data generator 95 can also use the indication and terms provided by parser 108 to conduct a search in data templates 97 that returns previously prepared artificial documents or information that approximates an expected response to the request. Alternately, or in addition, data generator 95 can provide files with random repeated pattern content, such as "abcdabcd..." and with particular directory structures, directory names or file names that have some relationship to the indication provided by parser 108. Some types of information that parser 108 can use to generate contextual or thematic information include file content or a directory list, a name of a file, an owner of a file or a directory or volume where a requested file is located. Other types of information can be used as well, depending upon the request type, user membership in groups, login status, and any other type of information tending to indicate the context or theme of the request.

Parser 108 can collect information concerning an intruder request or response to help identify an intruder's intent, and return artificial data responses that meet expectations of the intruder.

Referring again to FIG. 9, security filter 94 registers with filter framework 92 for callback operations, such as callbacks based on requests and responses. In addition, security filter 94 registers for I/O priority, which determines where in a cascade of filters registered with filter framework 92 security filter 94 will be called. When security filter 94 registers with a higher I/O priority, it is called before other filters that register with a lower I/O priority. As with other filters, security filter 94 receives an I/O tag generated by filter framework 92 so that I/O generated from security filter 94 can be identified. Identification through the use of tags assigned by filter framework 92 helps to avoid conflicts that may occur with filters requesting the same resources, or filters that may cause or exhibit re-entrant behavior.

Depending upon the position of filter framework 92 in the filer, security filter 94 may operate on converted system internal requests and responses, or may operate on requests and responses within higher level protocols, such as external or network protocols. Filter framework 92 also provides management functions for security filter 94, such as loading and unloading, starting and stopping and filter configuration. Filter framework 92 produces callbacks upon implementation of each of the above functions. Security filter 94 implements callbacks as well, such as for file open, file read, file lookup, file write, get attribute and directory read, for examples. The callback model used by filter framework 92 may be the synchronous mode, the asynchronous mode or the asynchronous release mode, as determined by security filter 94 upon registration with filter framework 92. Security filter 94 preferably uses synchronous mode, although asynchronous and asynchronous release modes may also be readily used.

Security filter 94 may generate a number of states for maintaining artificial responses or trapping intruder requests or responses. These states can be made inconsistent if a volume is unmounted or just mounted, or if the filer is just brought online, or just ready to be placed offline. Security filter 94 registers for callbacks in these situations to help clarify internal states to remove inconsistencies and be ready to response appropriately when volumes or filers change state.

Security filter 94 also includes version information to take advantage of versioning in filter framework 92. For example, filter framework 92 permits filter upgrades that can be implemented on the basis of inconsistent versions of a filter. Filter framework 92 can determine an inconsistent version during an upgrade and cause a previous version filter to be stopped and unloaded, and an updated filter version to be loaded and started.

The request and response callbacks implemented by security filter 94 take advantage of contextual information in the request and response parameters. The request and response parameters may include a file name of a file to be opened, user credentials, external source address information, such as a source IP, a process and process name information, or a time for request or response.

Figure 11:
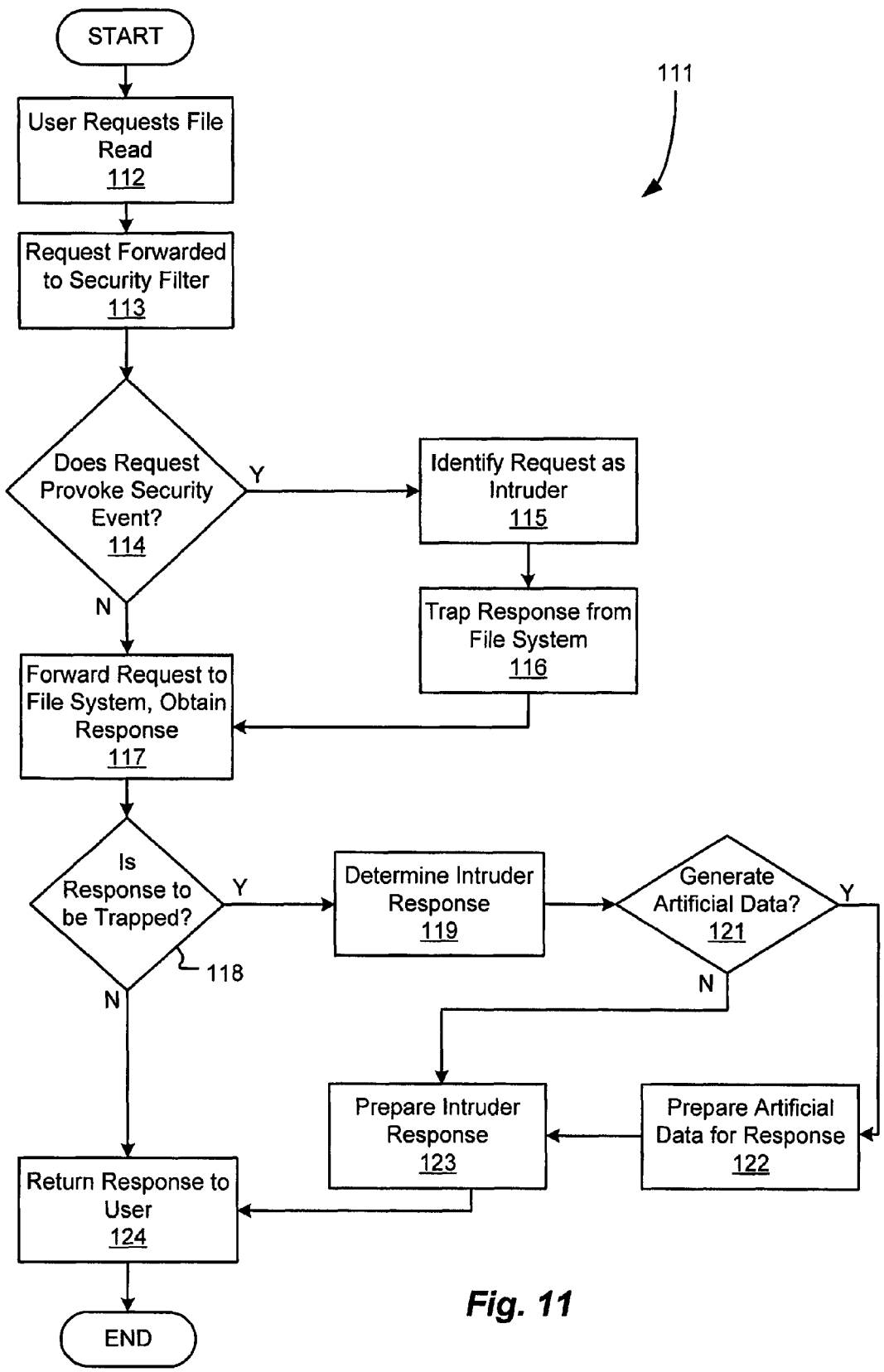
FIG. 11 is a flow chart showing actions and decision making for the security filter.

Referring now to FIG. 11, a flow chart 111 is illustrated that shows an operative flow for user requests that may be determined to be from an intruder. In a block 112, a user request is made for a file read. The file read request is forwarded to the security filter in a block 113. Because the user request involved a file read operation, and the security filter registered for callbacks in the event of a file read request, the security filter is invoked. Other exemplary events that invoke the security filter include file open, file write, get attributes, read directory and other events that might be involved in an attempt by an intruder to bypass system security.

In a decision block 114, the security filter determines whether the request indicates a security event. The request may indicate a security event based on a previous set of events, such as multiple access attempts from a given work station, or at given times of the day or night, or previous access denied responses from the file system. If the request does provoke a security event, the security filter identifies the request as an intruder request in a block 115, and sets a trap for the response from the file system in a block 116. If no security event is detected based on the request, the request is simply forwarded to the file system in a block 117. Requests identified as intruder requests are also forwarded to the file system in block 117, with the trap for the response being put in place from block 116.

A response from the file system is generated in block 117, and a decision block 118 determines whether the response should be trapped. If a trap was set in block 116, control transfers to a block 119, where the code executed by the trap determines the response to the intruder request. The code that is executed when the installed trap is triggered can be provided by event trapping 106. Event trapping 106 includes a number of options for code that can be executed when a response is trapped. One option for responding to the intruder request is to generate artificial data as determined in a decision block 121. If artificial data is to be generated, control transfers to a block 122, where artificial data is prepared by data generator 95 for the response to the intruder. The artificial data can be formed by consulting data templates 97, as described more fully above with respect to the description of FIG. 9. Otherwise, if a static or predetermined response is to be submitted to the intruder, data generator 95 provides the response, and control transfers to a block 123 where the intruder response is prepared for delivery. Artificially generated data from block 122, if any, is also used to prepare the intruder response in block 123. The prepared intruder response is returned to the user when control transfers to block 124.

If no trap was set in block 116 for the particular request, decision block 118 transfers control to block 124 to simply return the response to the user. By providing artificial data to an intruder as illustrated in flow diagram 111, the intruder is unaware of security access permissions established within the file system, and therefore cannot improve their understanding of the security access permissions.

The present invention is not limited to file systems having an operating system or a filter framework, but can be implemented with storage systems in general. For example, the security filter can be implemented in a driver for a storage system, or in a storage, device controller. In general, the security filter can be installed, configured and analyzed to review security events without significantly disrupting data flow to or from the storage device.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Example's of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A security filter for a data storage system having a storage device being accessible to a client interface to provide a response to the client interface in accordance with a request for data received from the client interface, the security filter comprising:

an intrusion detector coupled to the client interface and being operable to determine that the request from the client interface is an intruder request or that the response from the storage device is an intruder response, wherein the intruder request or intruder response result from an unauthorized attempt to access information related to a content of the storage device; and a response generator coupled to the storage device and the client interface and being operable to:
 intercept the intruder response from the storage device and prevent the intruder response from reaching the client interface;
 generate a substitute response containing artificial information corresponding to the detected intruder request or intruder response; and
 provide the substitute response containing artificial information to the client interface instead of providing the requested data to the client interface.

2. The security filter according to claim 1, further comprising a trap mechanism for installing a trap to capture the intruder request or intruder response.

3. The security filter according to claim 2, wherein the intrusion detector further comprises one or more security event definitions for determining when the request or response is the intruder request or the intruder response.

4. A security filter according to claim 3, further comprising a trap manager responsive to the one or more security event definitions to invoke the trap mechanism to cause a trap to be installed to capture the intruder response.

5. The security filter according to claim 1, wherein the intrusion detector further comprises one or more security event definitions for determining when the request or response is the intruder request or the intruder response.

6. The security filter according to claim 5, wherein the security event definition comprises an expression representing one or more conditions related to the request from the client interface or the response from the storage device.

7. The security filter according to claim 6, wherein the request from the client interface comprises a file open command, a file read command, a file write command, a get attributes command or a directory read command.

8. The security filter according to claim 1, further comprising an alarm indication, operable to be triggered by the intruder response.

9. The security filter according to claim 1, wherein the intruder response has an intruder content that influences the response generator to generate the substitute response to have a substitute content that is related to the intruder content.

10. The security filter according to claim 1, wherein the response generator further comprises a data generator for generating at least a portion of the substitute response.

11. The security filter according to claim 10, wherein the data generator is operable to generate artificial directory, file or block information related to the unauthorized information access attempt.

12. The security filter according to claim 10, further comprising one or more data templates accessible by the data generator to contribute to providing the artificial information.

13. The security filter according to claim 1, further comprising predetermined information accessible to the data generator to contribute to generating the substitute response.

14. The security filter according to claim 1, further comprising an intruder event log for storing a record of events related to the unauthorized information access attempt.

15. The security filter according to claim 1, wherein the security filter is implemented as a kernel mode filter.

16. The security filter according to claim 1, further comprising a plurality of selectable points in a data path between the client interface and the storage device for capturing request or response information related to operation of the security filter.

17. The security filter according to claim 16, wherein the security filter is a kernel mode filter that is compiled from a single source and is independent of the points at which the security filter is coupled to the data path.

18. The security filter according to claim 1, further comprising a filter framework coupled to the data storage system and operable to provide management functions for the security filter.

19. The security filter according to claim 18, wherein the security filter may be implemented with the filter framework as a synchronous, an asynchronous or an asynchronous release mode filter.

20. The security filter according to claim 18, wherein the security filter is configured and arranged with the filter framework to permit the filter framework to invoke the security filter and continue processing the request from the client interface or the response from the storage device.

21. A security filter for a data storage system having a storage device being accessible to a client interface to provide a response to the client interface in accordance with a request for data received from the client interface, the security filter comprising:
an intrusion detection means coupled to the client interface for determining that the request from the client interface is an intruder request or that the response from the storage device is an intruder response, wherein the intruder request or intruder response result from an unauthorized attempt to access information related to a content of the storage device; and
a response generation means coupled to the storage device and the client interface for:
intercepting the intruder response from the storage device and preventing the intruder response from reaching the client interface;
generating a substitute response containing artificial information corresponding to the detected intruder request or intruder response; and
providing the substitute response containing artificial information to the client interface instead of without providing the requested data to the client interface.

22. A security filter for a data storage system having a storage device and being accessible to a client interface, the security filter comprising:
a security event definition for identifying unauthorized attempts made through the client interface to access information related to the storage device;
a trap mechanism operable to install a trap that can block access to the information related to be identified unauthorized attempts to access the storage device;
a trap manager responsive to the unauthorized attempts identified by the security event definition to control the trap mechanism to cause the trap to be installed; and
a data generator operable to form an information substitute to be provided to the client interface when the trap blocks access to the information related to the identified unauthorized attempts to access the storage device, wherein the information substitute is artificial information corresponding to a content of the unauthorized attempts to access the storage device, and wherein the information substitute is provided to the client interface instead of the information related to the identified unauthorized attempts to access the storage device.

23. The security filter according to claim 22, further comprising a filter framework coupled to the data storage system and operable to provide management functions for the security filter.

24. The security filter according to claim 22, wherein the data generator further comprises a data template operable to produce at least a portion of the information substitute.

25. The security filter according to claim 22, wherein an identified unauthorized access attempt involves a command for one or more of a file open, file read, file write, get attributes or directory read.

26. A security filter for a data storage system having a storage device and being accessible to a client interface, the security filter comprising:
a trap manager responsive to information stemming from an intruder request from the client interface or an intruder response from the storage device to determine a security filter action;
a trap mechanism operable to block data related to the intruder request or the intruder response based on the security filter action, under control of the trap manager; and
a response mechanism for forming a response provided to the client interface, the response including substitute data, wherein the substitute data is artificial information corresponding to a content of the intruder request or the intruder response, wherein the substitute data is provided instead of the data related to the intruder request or the intruder response.

27. The security filter according to claim 26, further comprising a data generator for generating the substitute data.

28. A method for securing a data storage system having a storage device being accessible to a client interface to provide a response to the client interface in accordance with a request for data received from the client interface, the method comprising:
determining when the request from the client interface is an intruder request or that the response from the storage device is an intruder response, wherein the intruder request or intruder response result from an unauthorized attempt to access information related to a content of the storage device;

intercepting the intruder response from the storage device and preventing the intruder response from reaching the client interface;

generating a substitute response containing artificial information corresponding to the detected intruder request or intruder response; and providing the substitute response containing the artificial information to the client interface instead of providing the requested data to the client interface.

29. The method according to claim 28, wherein blocking the intruder response further comprises trapping the intruder response.

30. The method according to claim 29, further comprising triggering an alarm when the intruder response is trapped.

31. The method according to claim 29, further comprising generating the substitute response based on the intruder request or the intruder response when the intruder response is trapped.

32. The method according to claim 31, wherein generating the substitute response further comprises generating artificial directory, file or block information.

33. The method according to claim 28, wherein determining the intruder request or intruder response further comprises evaluating a security event definition.

34. The method according to claim 33, further comprising installing a trap to block the intruder response.

35. The method according to claim 28, further comprising accessing a data template to obtain information for generating the artificial information.

36. The method according to claim 28, further comprising accessing predetermined static information for generating the artificial information.

37. The method according to claim 28, further comprising storing a record of events related to the intruder request or intruder response.

38. The method according to claim 28, further comprising implementing the security filter as a kernel mode filter.

39. The method according to claim 28, further comprising positioning the security filter at one or more points in a data path between the client interface and the storage device for capturing request or response information related to operation of the security filter.

40. The method according to claim 39, further comprising compiling the security filter as a kernel mode filter from a single source to be independent of the points at which the security filter is coupled to the data path.

41. The method according to claim 28, further comprising implementing the security filter as a synchronous, an asynchronous or an asynchronous release mode filter.

42. A method for providing security in a data storage system having an input/output (I/O) interface and a storage media, comprising:

receiving an incoming request from the I/O interface and providing an outgoing request to the storage media, the incoming request including protocol information;

receiving an incoming response from the storage media and providing an outgoing response to the I/O interface, the outgoing response including the protocol information; and filtering information in the data storage system to modify information related to the outgoing request or the outgoing response and provide the modified information instead of providing the requested information, wherein the incoming request or the incoming response relates to an unauthorized attempt to access information in the data storage system, and wherein the modified information includes artificial information corresponding to the unauthorized attempt to access information in the data storage system.

43. A computer-program product comprising:

a computer-readable medium having computer program code embodied thereon for securing a data storage system having a storage device being accessible to a client interface to provide a response to the client interface in accordance with a request received from the client interface, the computer program code adapted to:

determine when the request from the client interface is an intruder request or when the response from the storage device is an intruder response, wherein the intruder request or intruder response result from an unauthorized attempt to access information related to a content of the storage device;

intercept the intruder response from the storage device and prevent the intruder response from reaching the client interface;

generate a substitute response containing artificial information corresponding to the detected intruder request or intruder response; and provide the substitute response containing the artificial information to the client interface instead of providing the requested information to the client interface.

* * * * *